Figure 61:
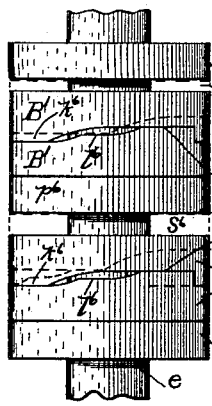

No. 723,357. PATENTED MAR. 24, 1903.
J. BOMA.
VOTING MACHINE.
APPLICATION FILED JAN. 8, 1902.
NO MODEL. 18 SHEETS—SHEET 1.
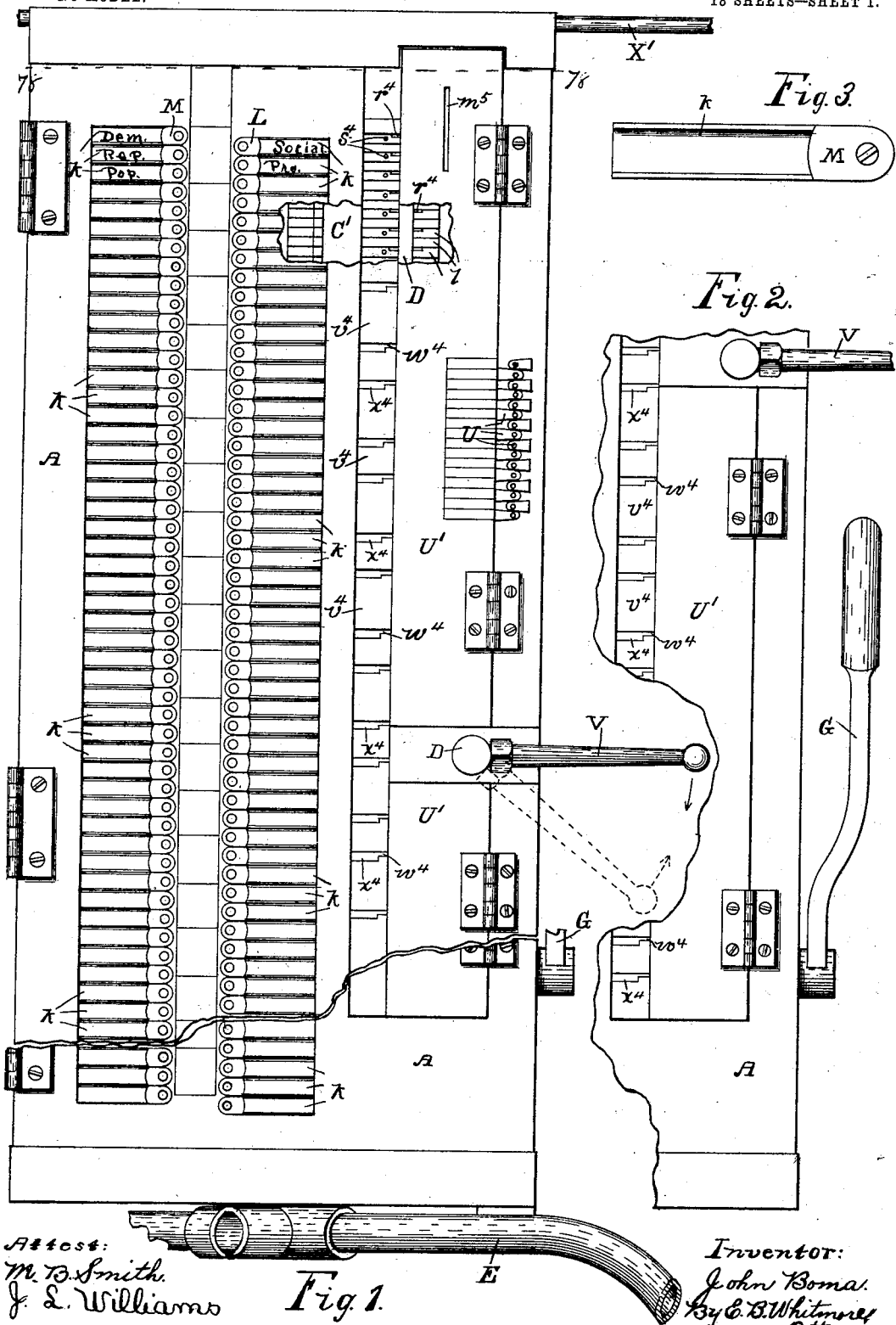
Attest:
M. B. Smith.
J. L. Williams.
Inventor:
John Boma.
By E. B. Whitmore
Atty No. 723,357. PATENTED MAR. 24, 1903.
J. BOMA.
VOTING MACHINE.
APPLICATION FILED JAN. 8, 1902.
NO MODEL. 18 SHEETS—SHEET 2.
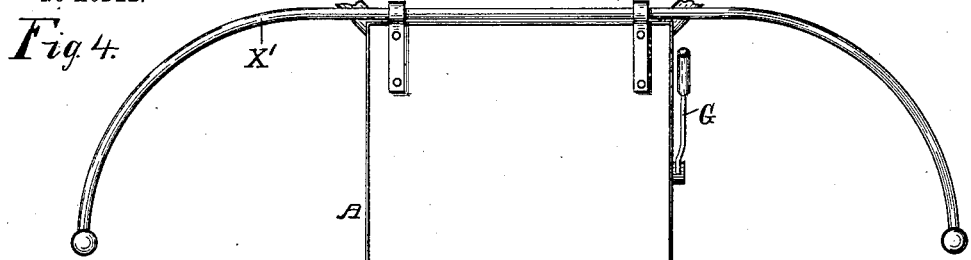
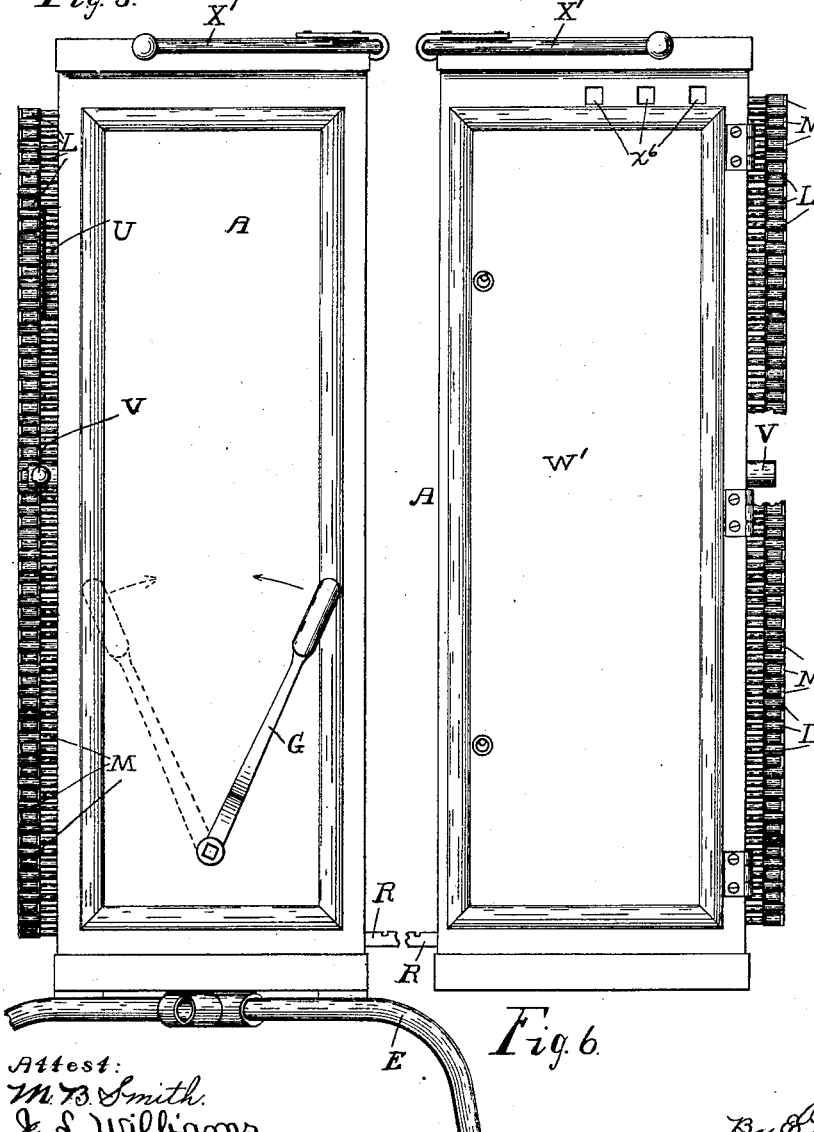
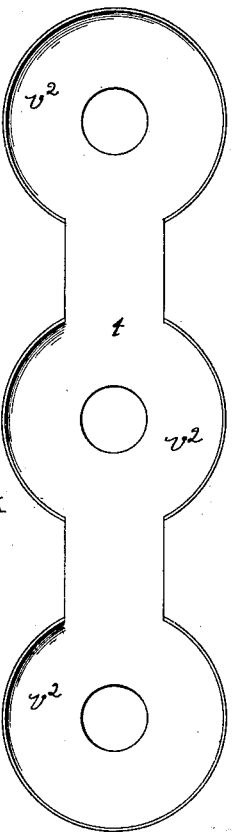
Attest:
M. B. Smith.
J. L. Williams
Inventor:
John Boma,
By E. B. Whitmore, Atty.

No. 723,357. PATENTED MAR. 24, 1903.
J. BOMA.
VOTING MACHINE.
APPLICATION FILED JAN. 8, 1902.
NO MODEL. 18 SHEETS—SHEET 3.
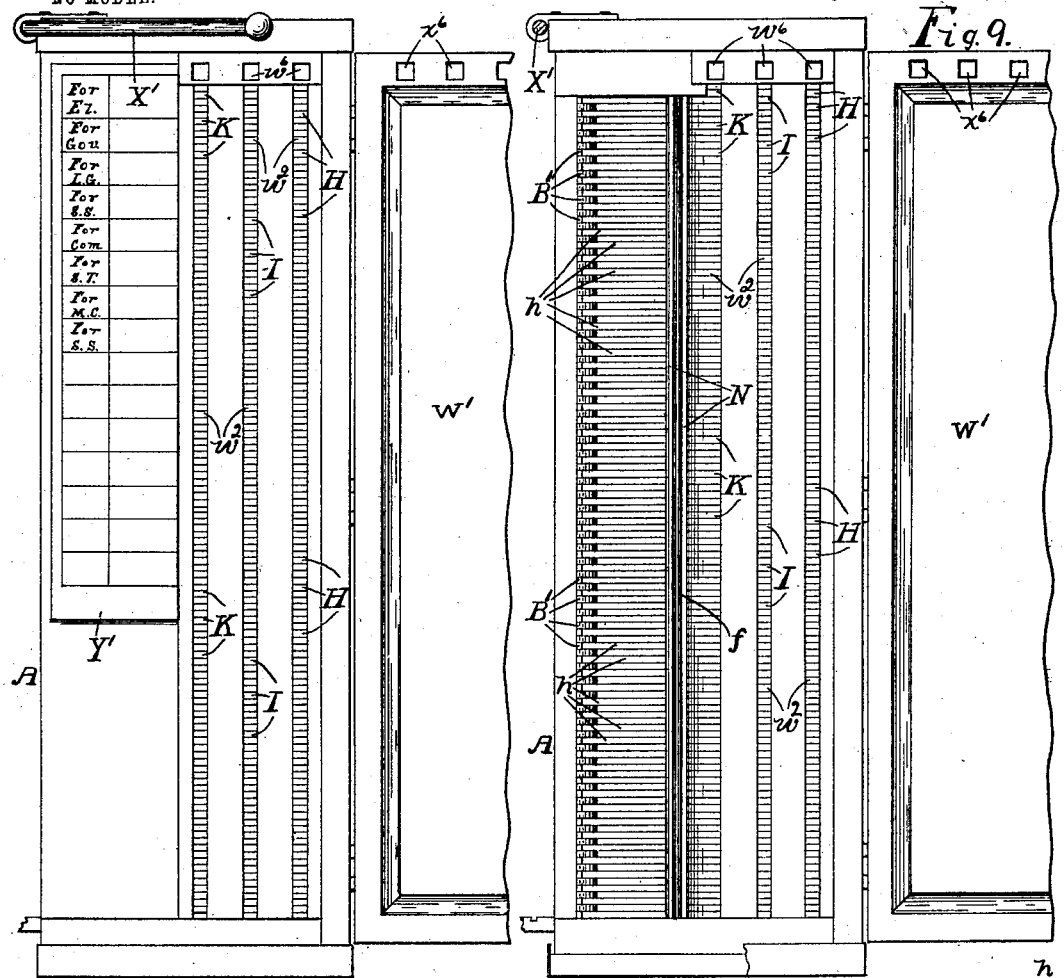
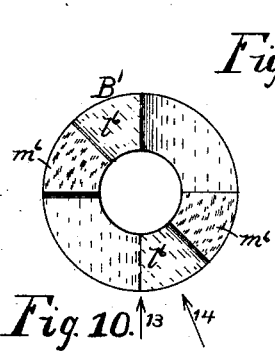
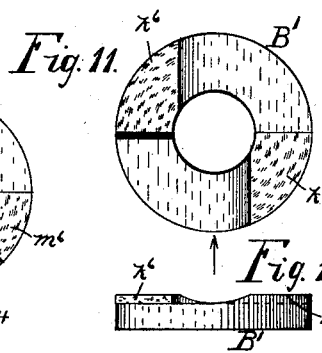
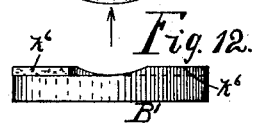
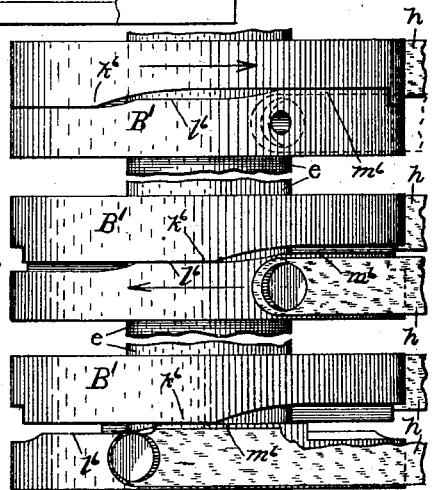
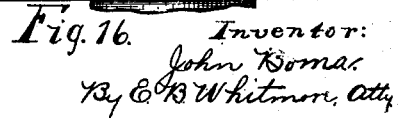

No. 723,357. PATENTED MAR. 24, 1903.
J. BOMA.
VOTING MACHINE.
APPLICATION FILED JAN. 8, 1902.
NO MODEL. 18 SHEETS—SHEET 4.
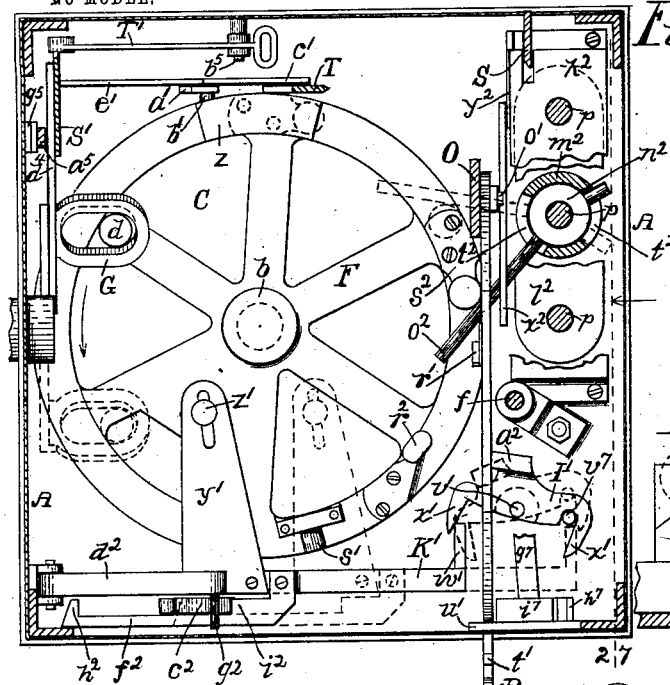
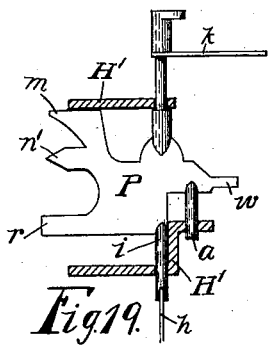
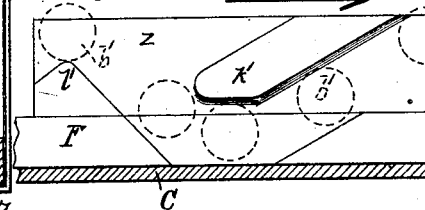
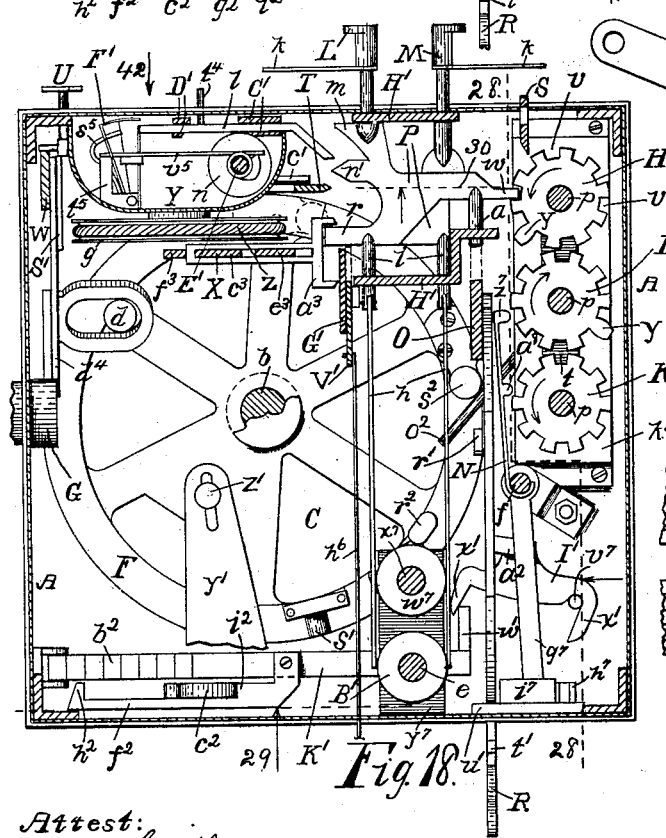
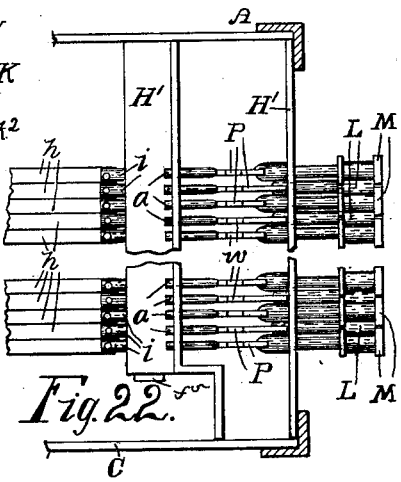
Attest:
M. B. Smith.
J. L. Williams.
Inventor:
John Boma
By E. B. Whitmore, Atty.

No. 723,357. PATENTED MAR. 24, 1903.
J. BOMA.
VOTING MACHINE.
APPLICATION FILED JAN. 8, 1902.
NO MODEL. 13 SHEETS—SHEET 5.
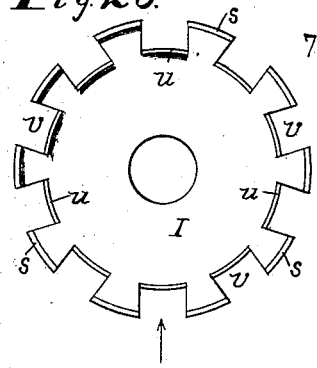
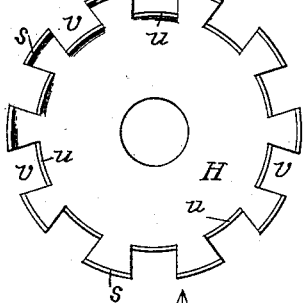
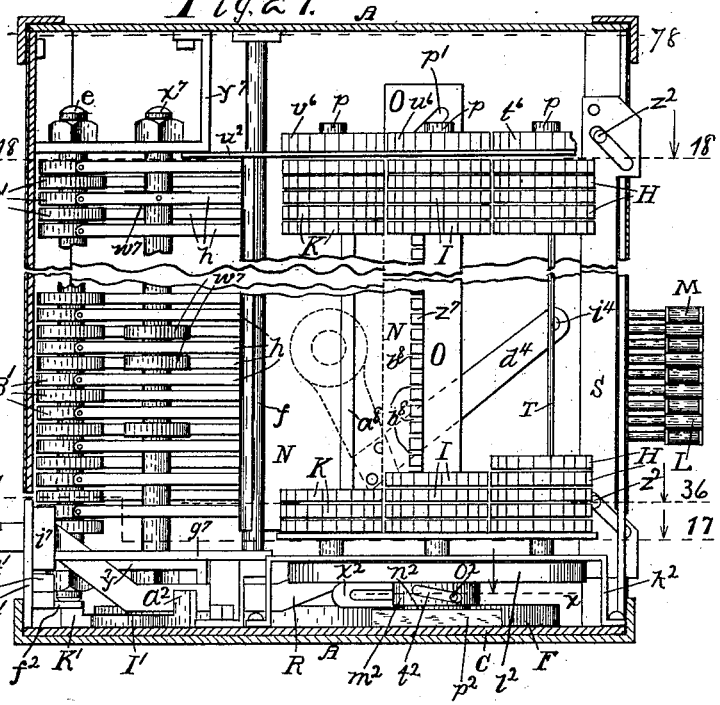
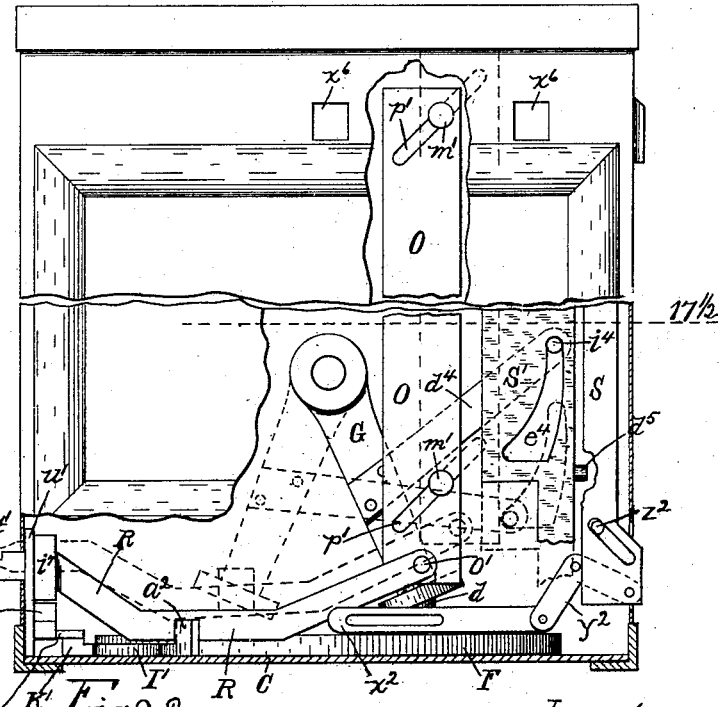
Attest:
M. B. Smith
J. L. Williams
Inventor:
John Boma
By E. B. Whitmore, Atty.

No. 723,357. PATENTED MAR. 24, 1903.
J. BOMA.
VOTING MACHINE.
APPLICATION FILED JAN. 8, 1902.
NO MODEL. 18 SHEETS—SHEET 6.
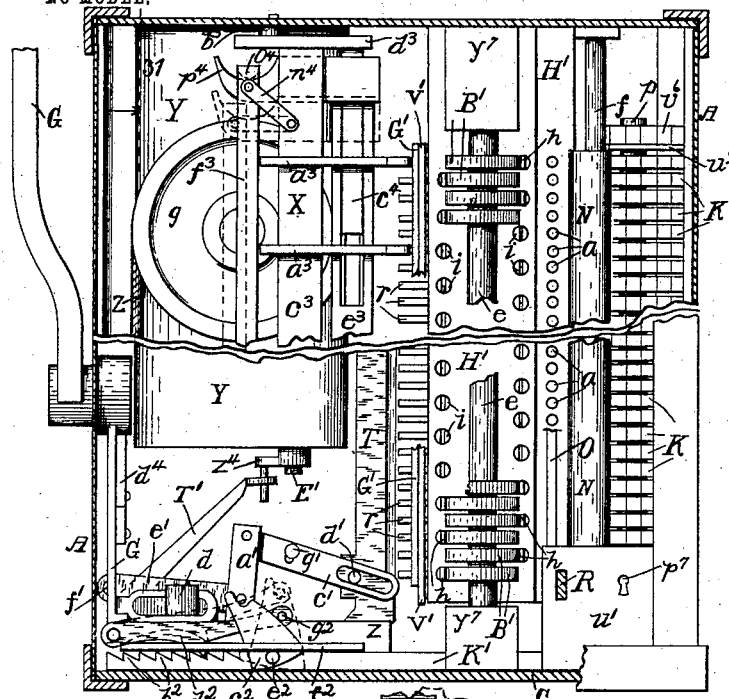
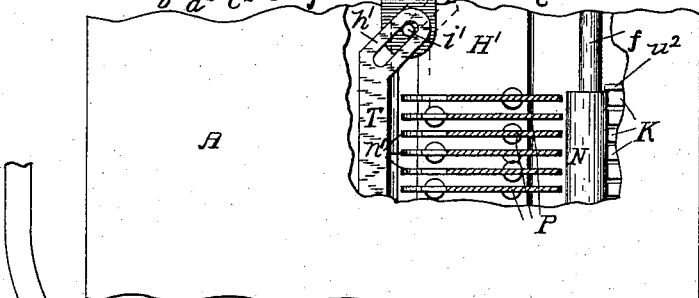
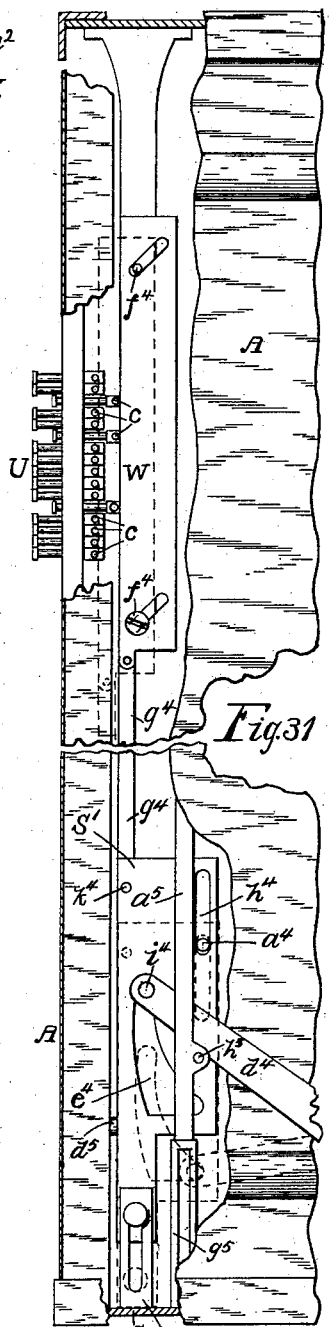

No. 723,357. PATENTED MAR. 24, 1903.
J. BOMA.
VOTING MACHINE.
APPLICATION FILED JAN. 8, 1902.
NO MODEL. 18 SHEETS—SHEET 7.
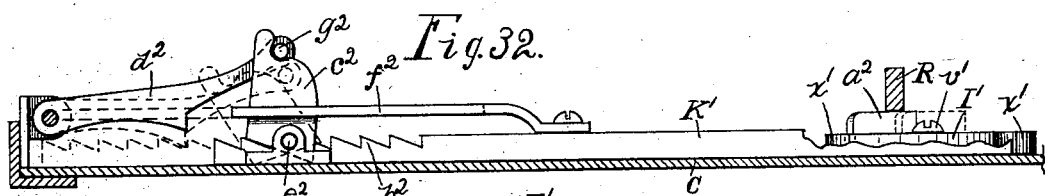
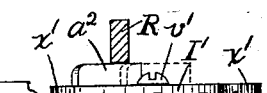
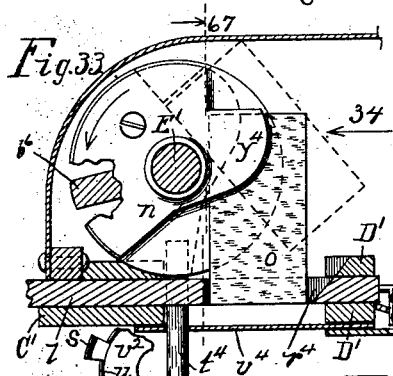
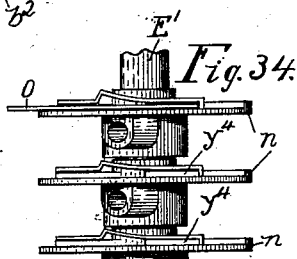
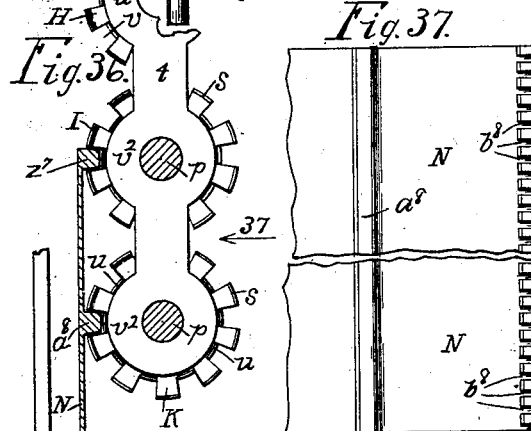
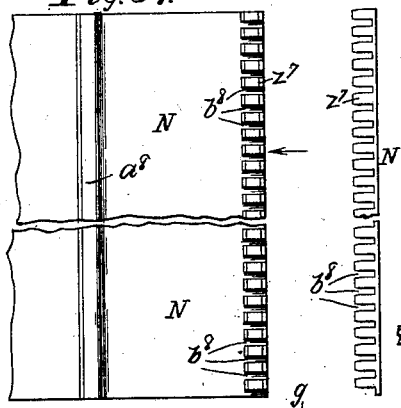
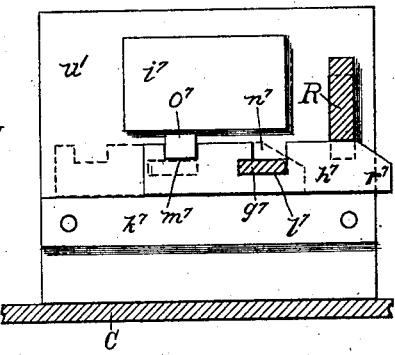
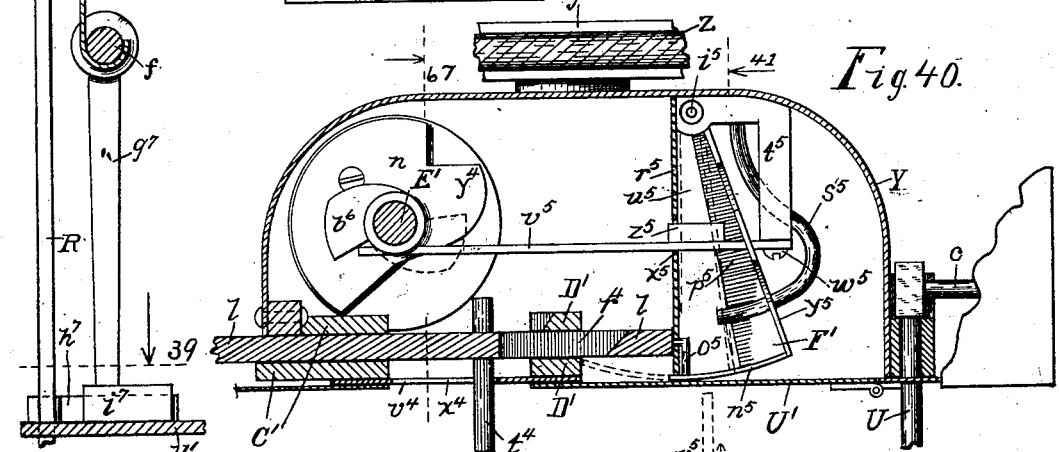
Attest:
M B Smith
J. L. Williams
Inventor:
John Boma
By E. L. Whitmore, Atty.

No. 723,357. PATENTED MAR. 24, 1903.
J. BOMA.
VOTING MACHINE.
APPLICATION FILED JAN. 8, 1902.
NO MODEL. 18 SHEETS—SHEET 9.
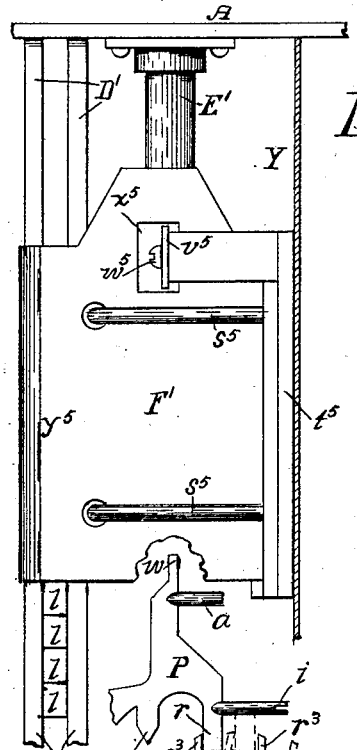
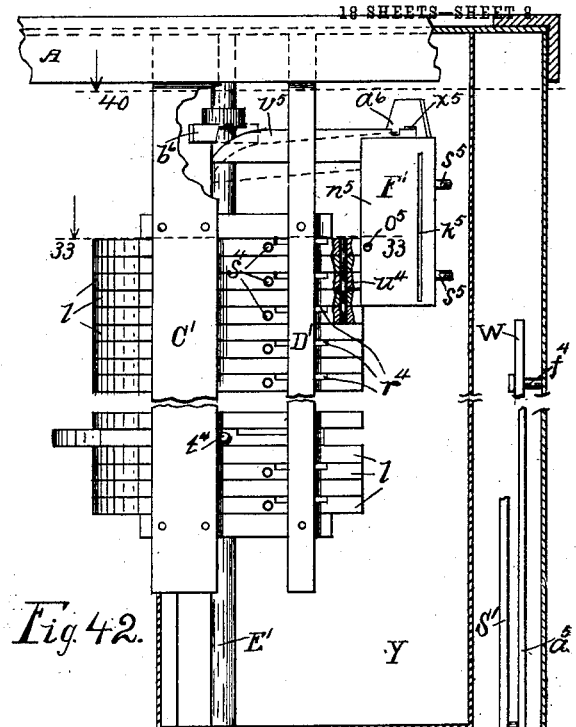
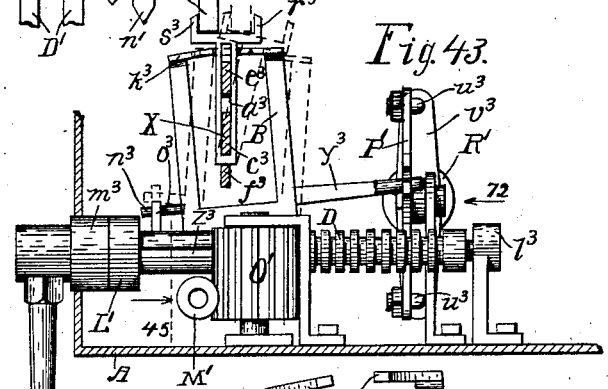
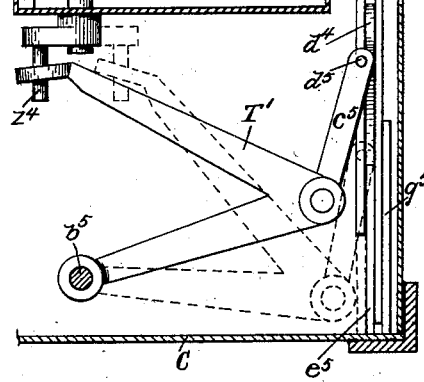
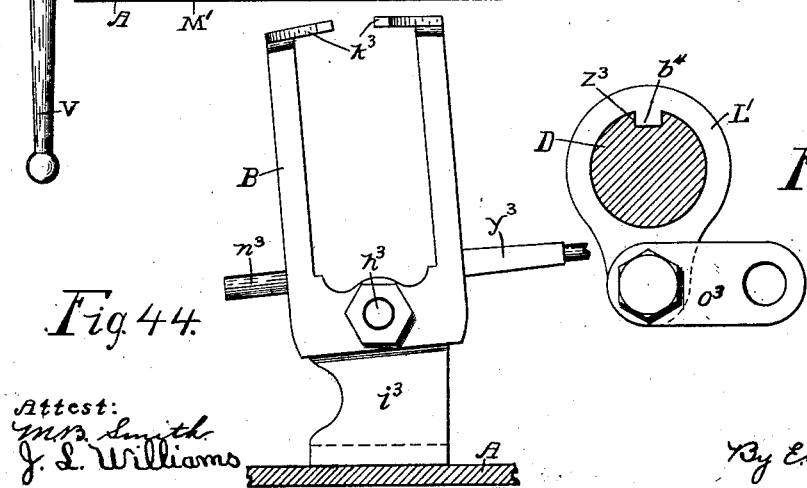
Attest:
M. B. Smith
J. L. Williams
Inventor:
John Boma,
By E. B. Whitmore, Atty.

No. 723,357. PATENTED MAR. 24, 1903.
J. BOMA.
VOTING MACHINE.
APPLICATION FILED JAN. 8, 1902.
NO MODEL. 18 SHEETS—SHEET 9.
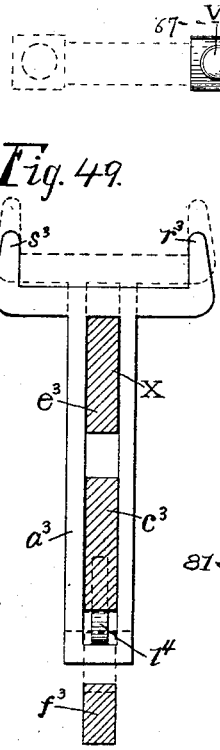
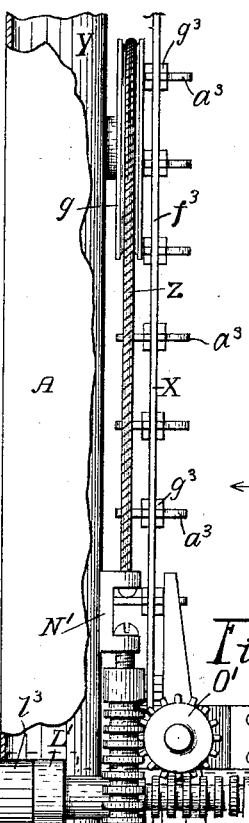
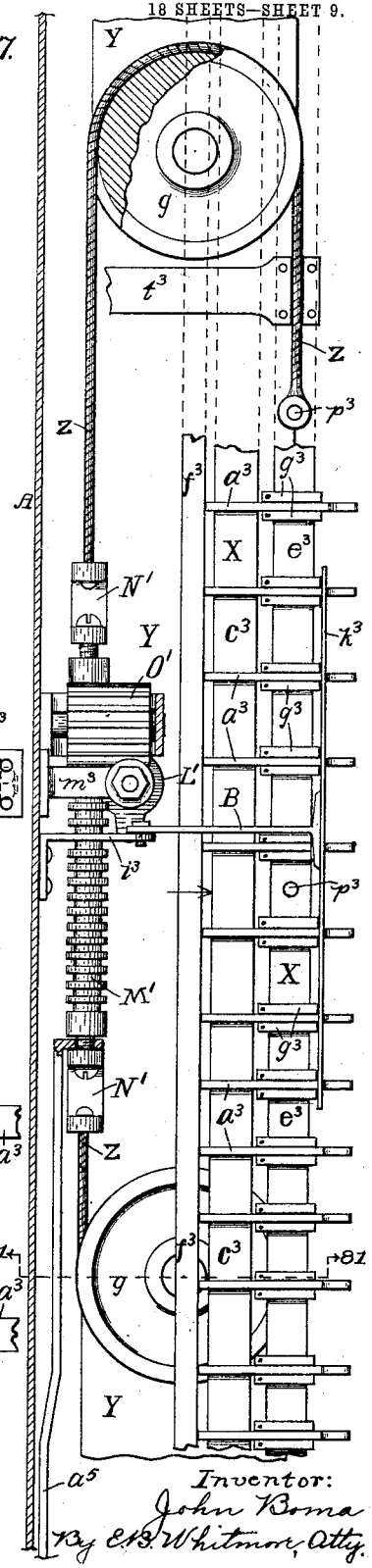
Fig. 48.
Fig. 47.
Fig. 46.
Fig. 49.
Fig. 50.
Attest:
M. B. Smith
J. L. Williams
Inventor:
John Boma
By E. S. Whitmore, Atty.

No. 723,357. PATENTED MAR. 24, 1903.
J. BOMA.
VOTING MACHINE.
APPLICATION FILED JAN. 8, 1902.
NO MODEL. 18 SHEETS—SHEET 10.
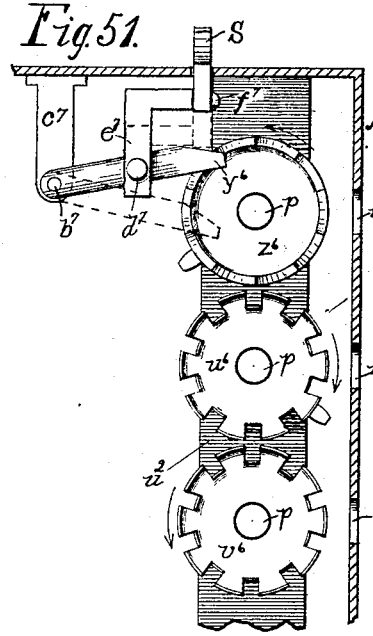
Fig. 51.
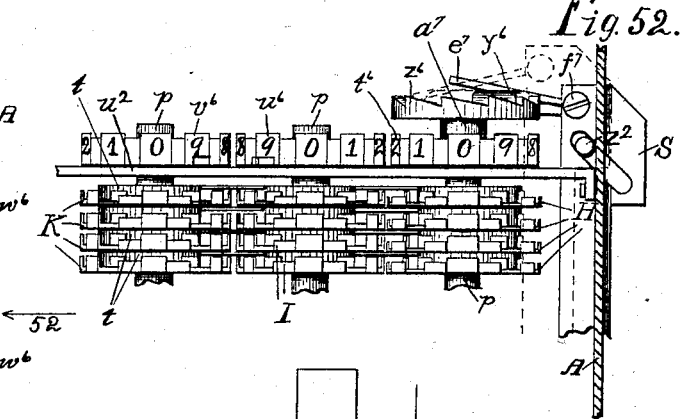
Fig. 52.
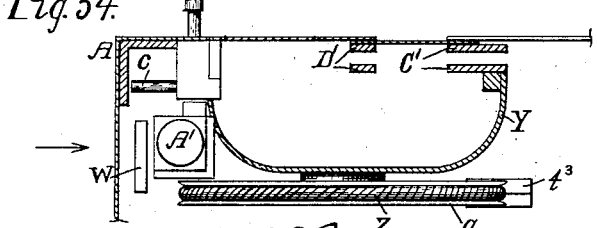
Fig. 54.
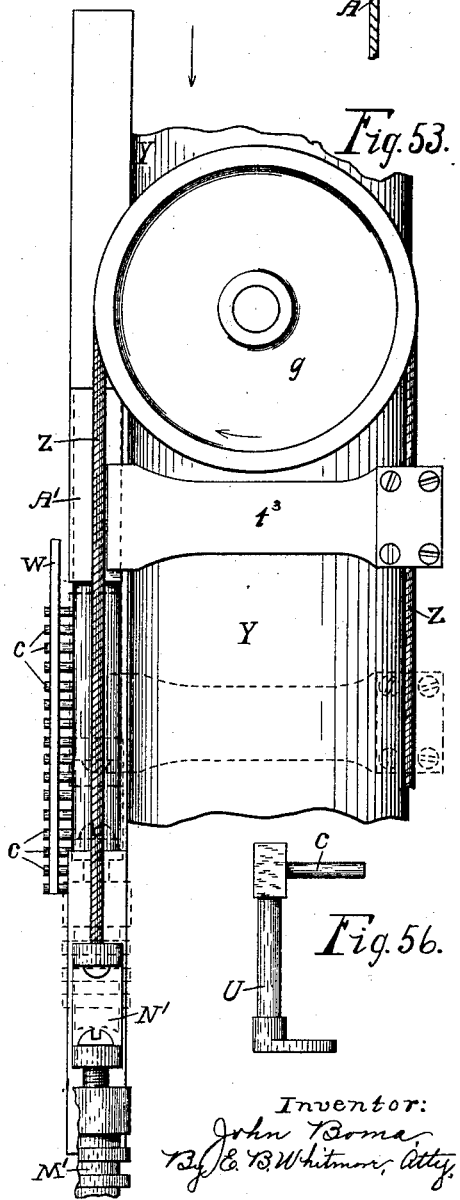
Fig. 53.
Fig. 56.
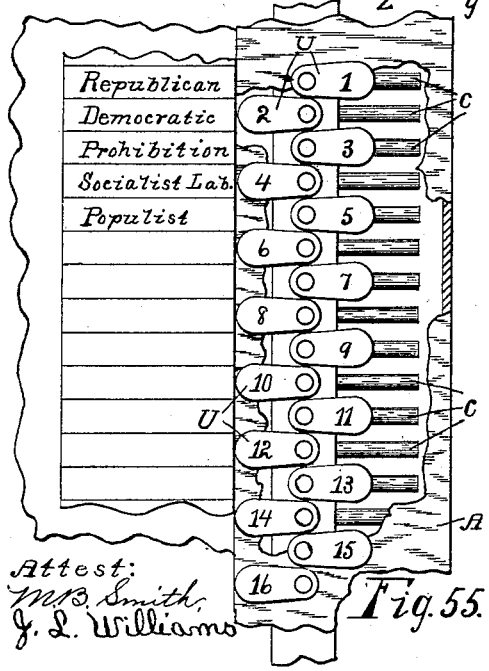
Fig. 55.
Attest:
M. B. Smith
J. L. Williams
Inventor:
John Boma
By E. B. Whitmore, Atty.

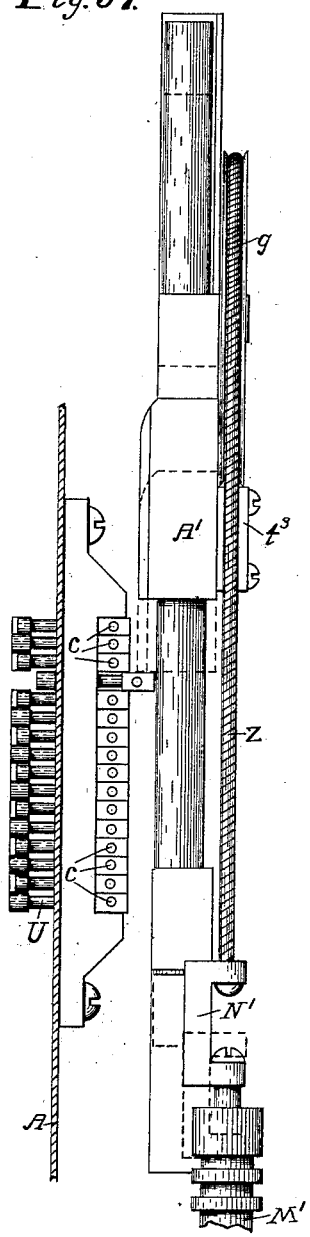

No. 723,357. PATENTED MAR. 24, 1903.
J. BOMA.
VOTING MACHINE.
APPLICATION FILED JAN. 8, 1902.
NO MODEL. 18 SHEETS—SHEET 12.

Attest:
M. B. Smith
J. L. Williams

Inventor:
John Boma
By E. B. Whitmun, Atty.

No. 723,357. PATENTED MAR. 24, 1903.
J. BOMA.
VOTING MACHINE.
APPLICATION FILED JAN. 8, 1902.
NO MODEL. 18 SHEETS—SHEET 13.
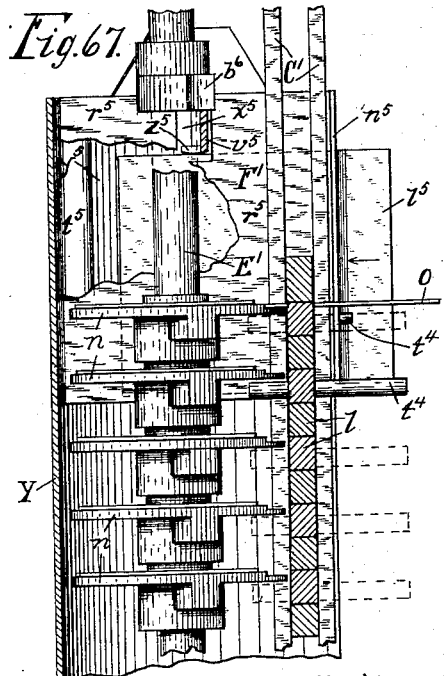
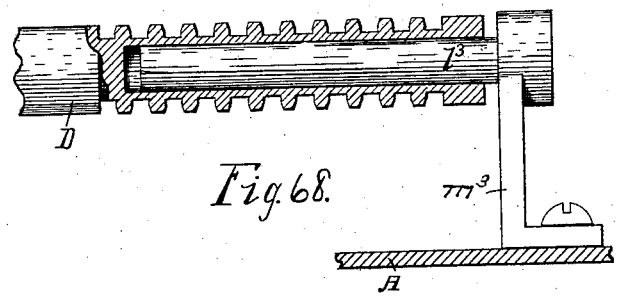
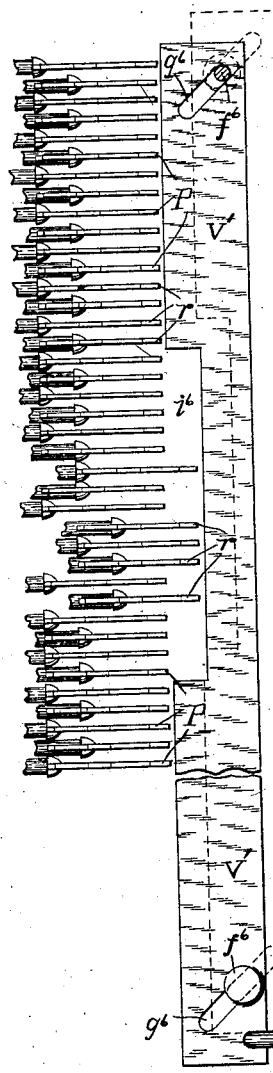
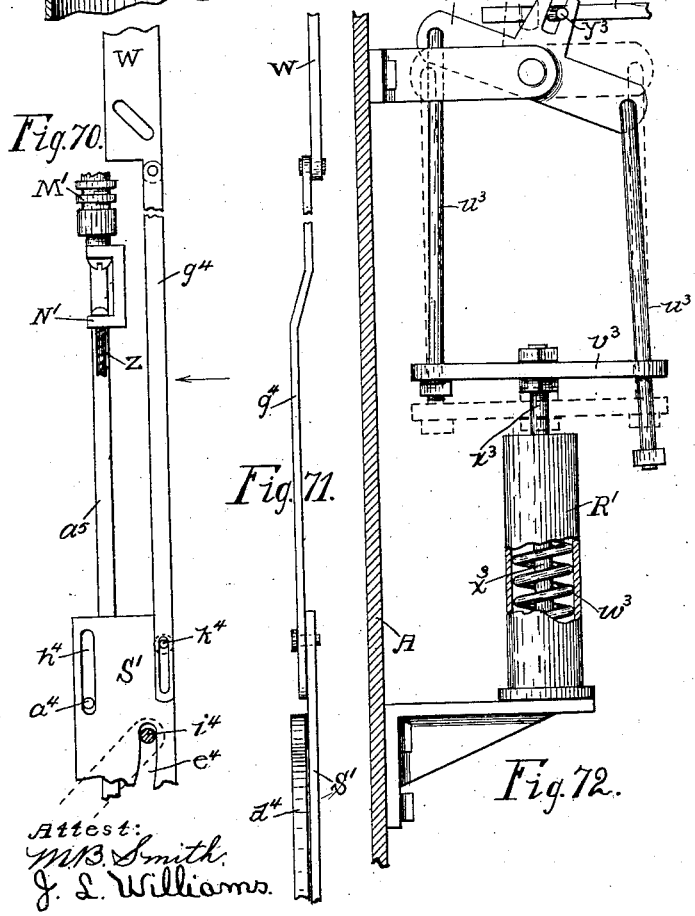
Attest:
M. B. Smith
J. L. Williams
Inventor:
John Boma
By E. B. Whitmore, Atty No. 723,357. PATENTED MAR. 24, 1903.
J. BOMA.
VOTING MACHINE.
APPLICATION FILED JAN. 8, 1902.
NO MODEL. 18 SHEETS—SHEET 14.
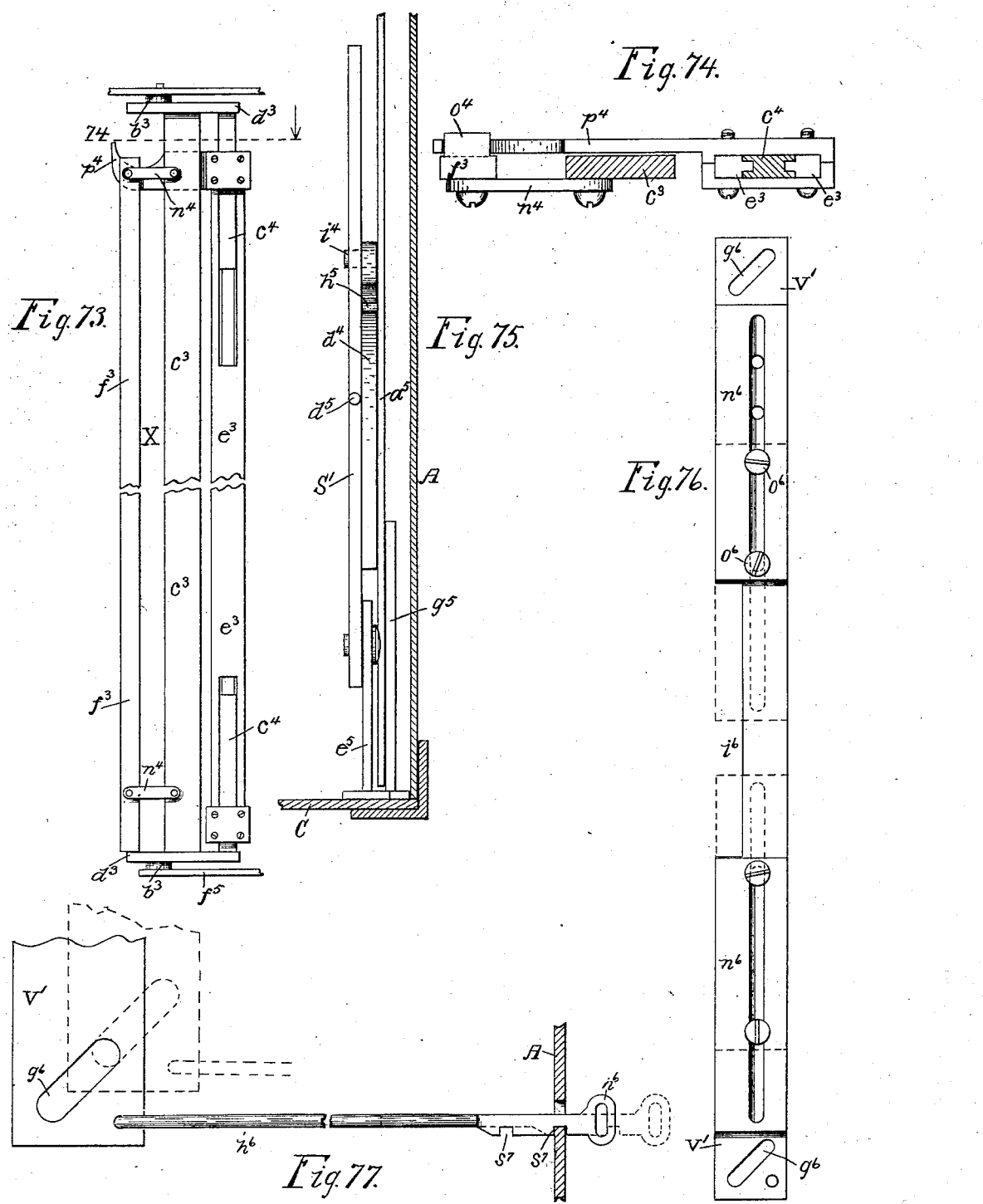

No. 723,357. PATENTED MAR. 24, 1903.
J. BOMA.
VOTING MACHINE.
APPLICATION FILED JAN. 8, 1902.
NO MODEL. 18 SHEETS—SHEET 16.

Attest:
M. B. Smith
J. L. Williams

Inventor:
John Boma
By J. E. B. Whitmore, atty.

No. 723,357. PATENTED MAR. 24, 1903.
J. BOMA.
VOTING MACHINE.
APPLICATION FILED JAN. 8, 1902.
NO MODEL. 18 SHEETS—SHEET 16.
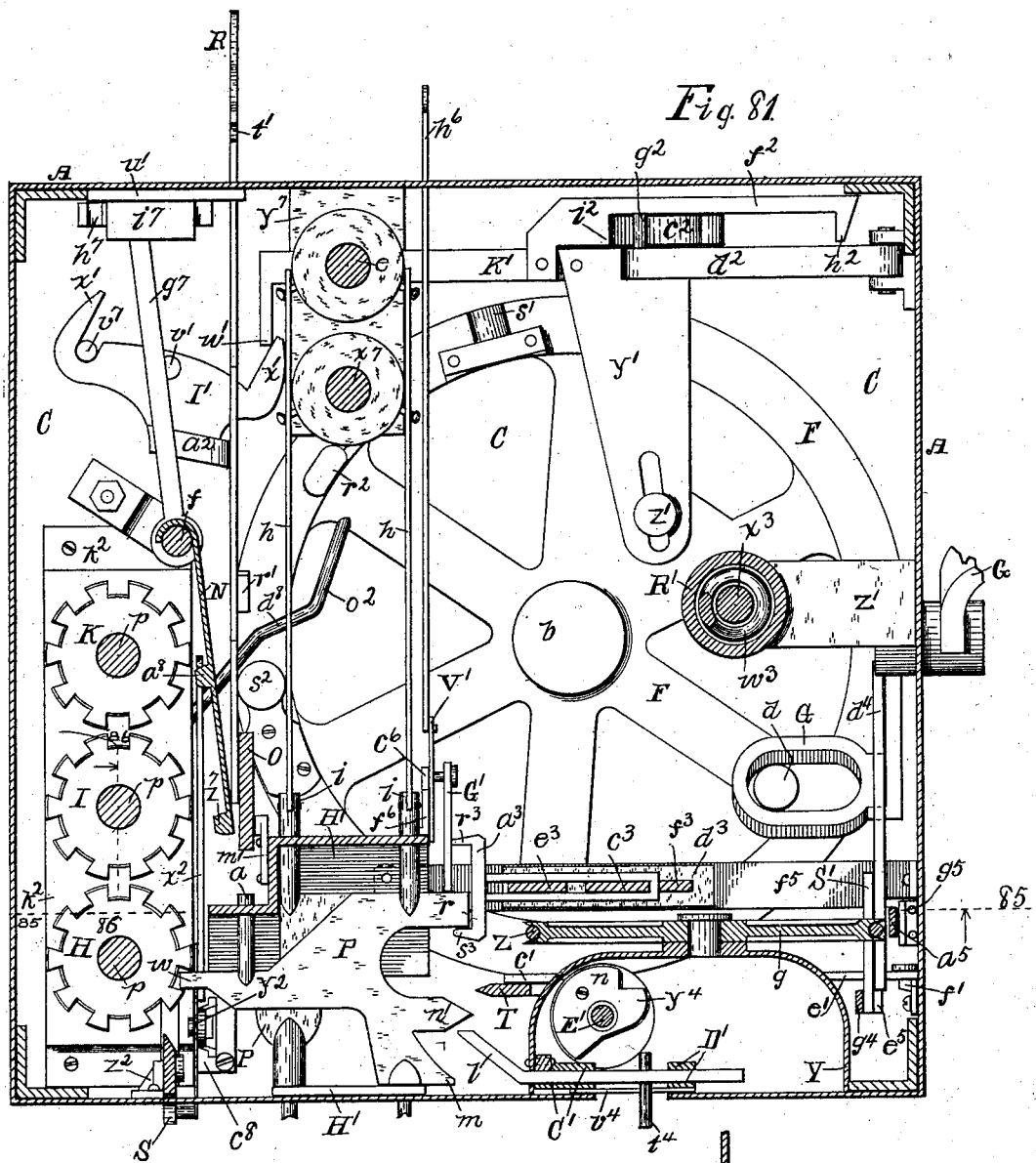
Fig. 81.
Fig. 82.
Attest: 
Inventor:
John Boma,
By E. B. Whitmore, Atty No. 723,357. PATENTED MAR. 24, 1903.
J. BOMA.
VOTING MACHINE.
APPLICATION FILED JAN. 8, 1902.
NO MODEL. 18 SHEETS—SHEET 17.
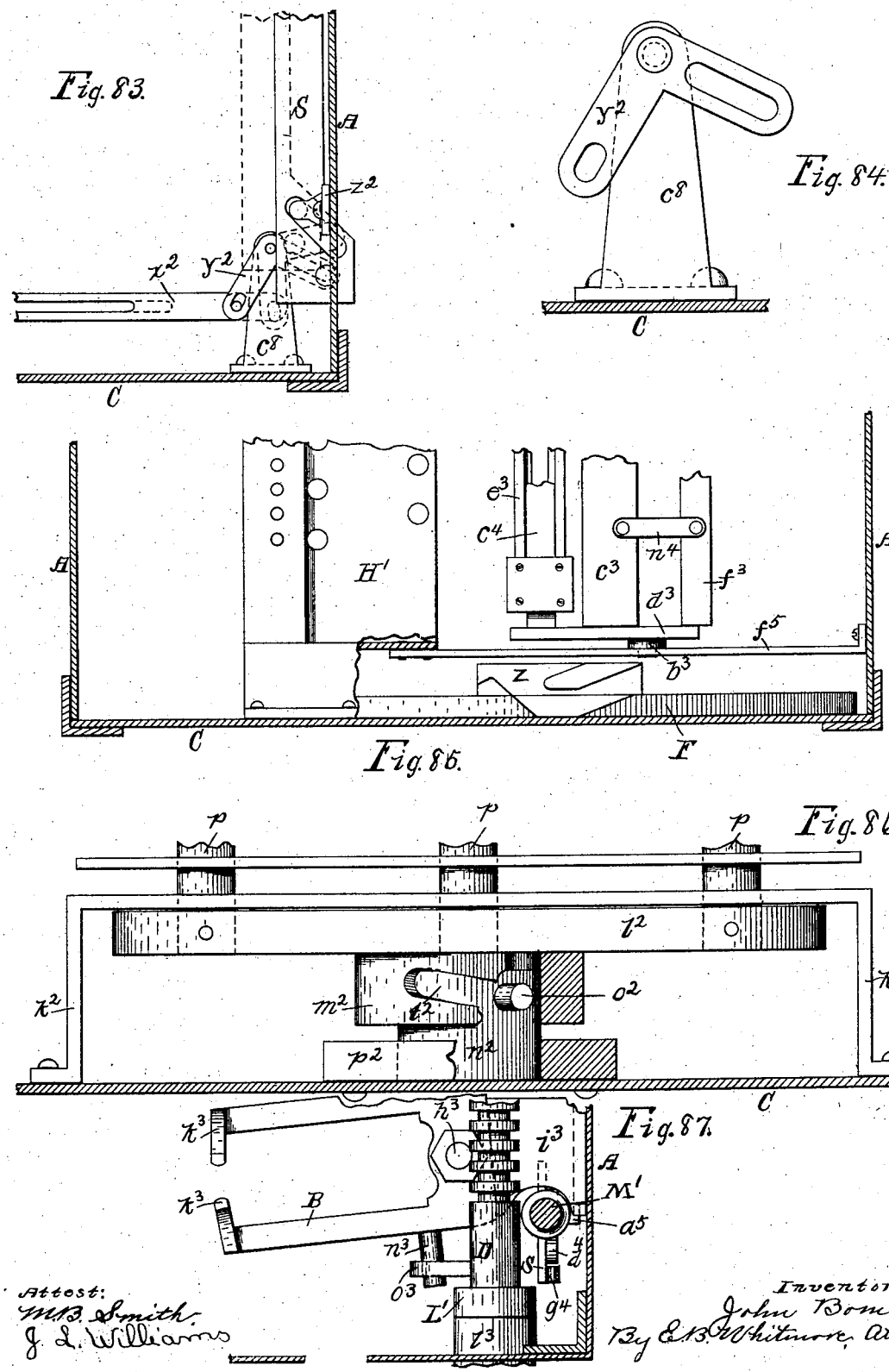

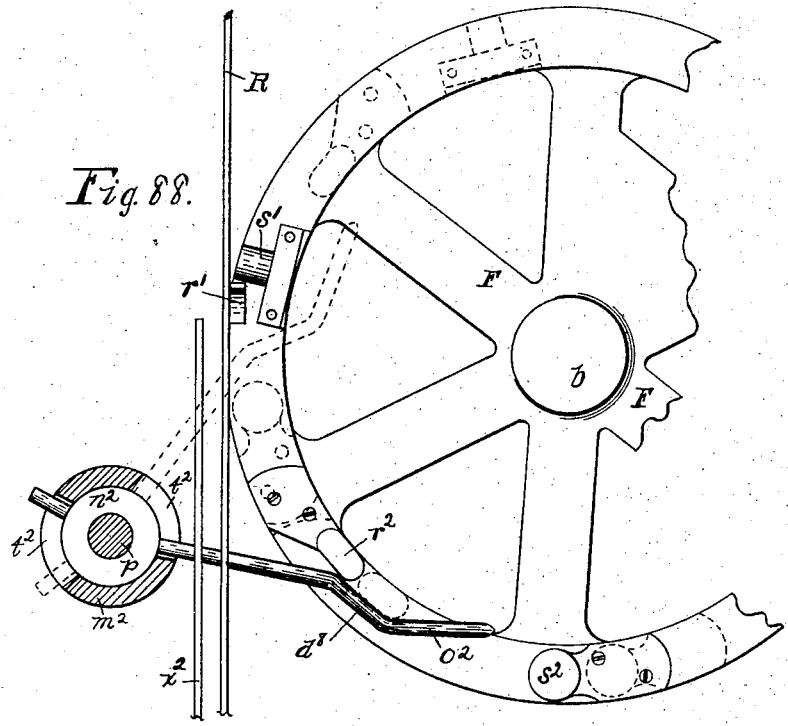

UNITED STATES PATENT OFFICE.

JOHN BOMA, OF ROCHESTER, NEW YORK, ASSIGNOR OF ONE-HALF TO CHARLES A. WEBSTER, OF ROCHESTER, NEW YORK.

VOTING-MACHINE.

SPECIFICATION forming part of Letters Patent No. 723,357, dated March 24, 1903.

Application filed January 8, 1902. Serial No. 88,889. (No model.)

*To all whom it may concern:*

Be it known that I, JOHN BOMA, of Rochester, in the county of Monroe and State of New York, have invented a new and useful Improvement in Voting-Machines, which improvement is fully set forth in the following specification and shown in the accompanying drawings.

My invention is an improved voting-machine to be used at popular elections, the same being hereinafter fully described, and more fully pointed out in the claims.

The laws of the various States of the Union regulating popular elections differ materially in important essentials, on account of which a voting-machine constructed to act or operate in a manner to meet the legal requirements of one section of the country would not be of the kind or have the capabilities required for a voting-machine to be used in another section, different kinds of machines and operating to produce different results being necessary for use in different States. Furthermore, the election laws of the various States are frequently amended or changed as to important particulars, which necessitates the abandoning of voting-machines that were once useful and proper and the substitution therefor of new and different ones, adapted to fit the new conditions and requirements of the changed laws. For example, in some cases voting-machines that were right and proper to be used at the election one year would be useless for the election of the following year, as some new and unexpected requirement of them would be made by law which they were not constructed to meet. In consideration of these facts and of the necessities of the case in general the main object in producing my present invention has been to provide a universal voting-machine or one having capabilities coextensive with the requirements of the multifarious laws of all the States relating to elections—that is to say, a voting-machine in which there are provisions for all political parties that may ever contest at any election and having an unlimited capacity for division in the matter of making up irregular ballots and for the unlimited grouping of names of candidates.

Another object of the invention is to simplify the voting-machine by constructing it so as to have the voting-keys for split ballots, the counters, and the locking-disks all in continuous vertical rows and to avoid the use of "dummy" tickets where there are no nominations.

A further object of the invention is to produce a voting-machine for general use at popular elections compact in structure and reduced to small lateral dimensions, so as to be easily handled and occupying small space in the polling-rooms and also convenient for shipping and storing.

Other objects and advantages of the invention will be brought out and made to appear in the following specification, reference being had to the accompanying drawings.

Figure 62:
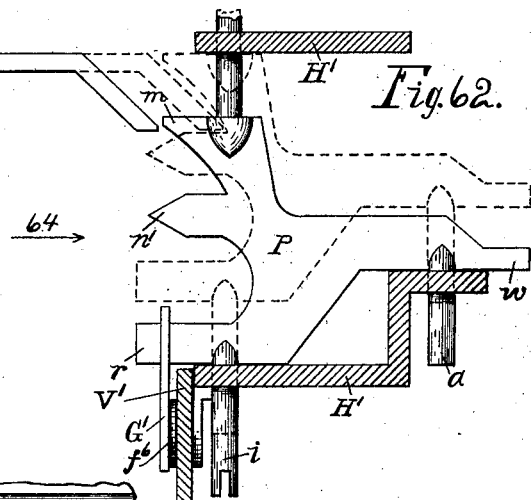
Figure 63:
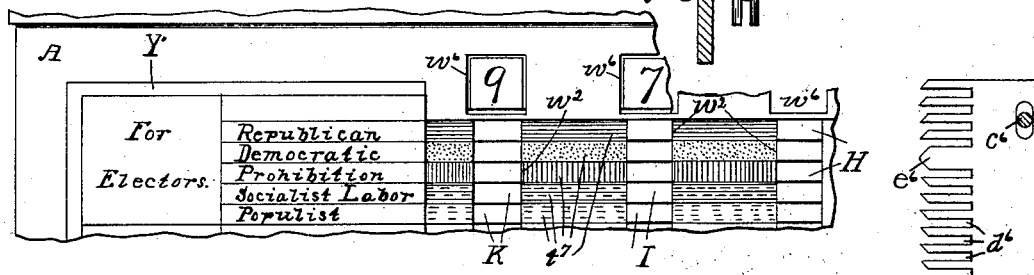
Figure 64:
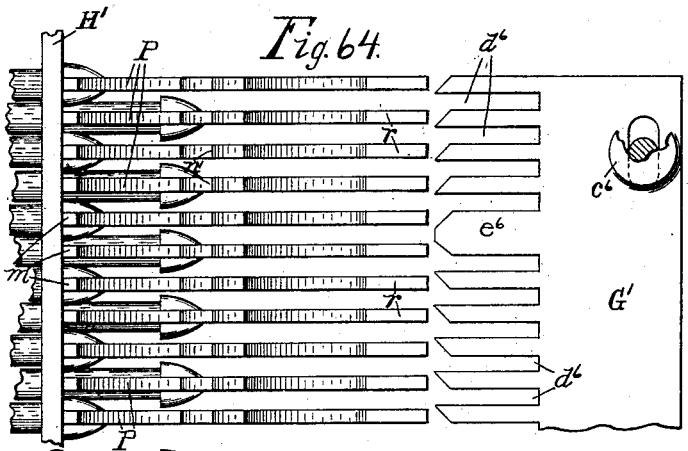
Figure 65:
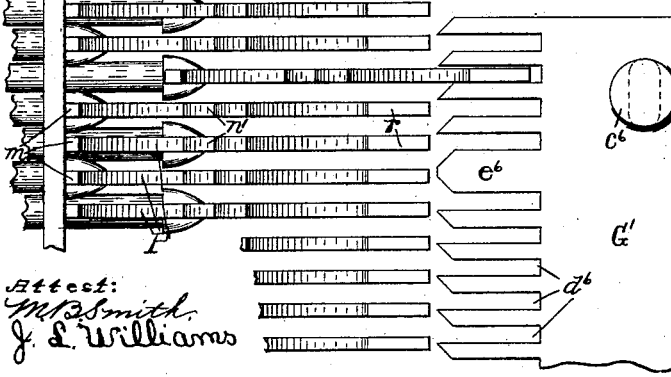
Figure 66:
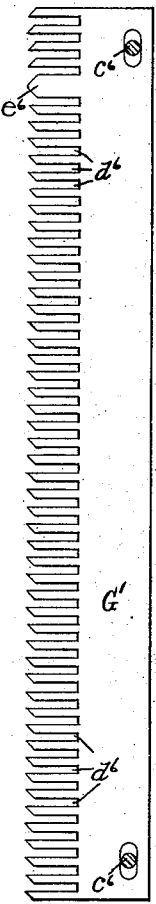
Figures 78, 79, 80:
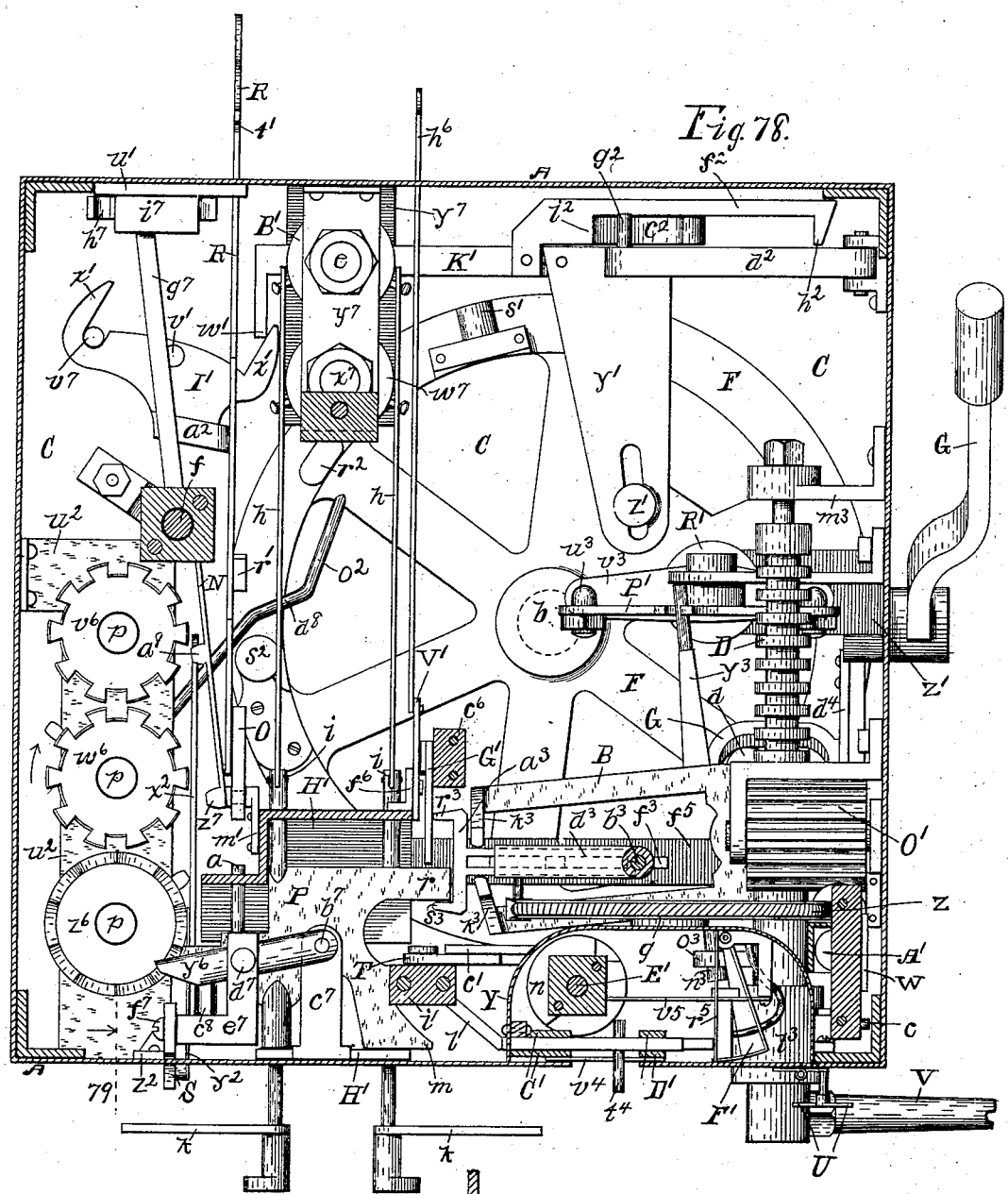

Referring to the drawings, Figure 1 is a front elevation of the voting-machine with parts broken away. Fig. 2 is a front view of parts of the machine, showing more fully the general returning-lever at the side. Fig. 3 is a front view of a ticket-holder and voting-key. Fig. 4 is a view looking down on top of the machine. Figs. 5 and 6 show, respectively, the right and the left sides or faces of the machine. Fig. 7 is a plan of a counter-yoke. Fig. 8 is a view of parts at the left side of the machine, the covering-door being swung back. Fig. 9 further shows parts at the left of the machine, the door being open and parts omitted. Fig. 10 is a plan of the operating-face of the lower locking-disk of a pair. Fig. 11 shows the operating-face of the upper locking-disk of a pair. Fig. 12 is an edge view of the upper locking-disk seen as indicated by arrow in Fig. 11. Fig. 13 is an edge view of the lower locking-disk seen as indicated by arrow 13 in Fig. 10. Figs. 14, 15, and 16 show, respectively, edge views of pairs of locking-disks differently related as in voting. Fig. 17 is a plan of some of the lower interior parts of the machine, parts being horizontally sectioned on the dotted lines 17 17 and $x$ in Fig. 27 and $17\frac{1}{2}$ in Fig. 28, parts being broken away and omitted and other parts shown in various positions by full and dotted lines. Fig. 18 is a plan of upper interior parts, parts being omitted and other parts horizontally sectioned on various planes. Fig. 19 is a plan of a push-plate detached, the holding-standards being horizontally sectioned. Fig. 20 is a view of a part of the base-wheel and main cam. Fig. 21 is a side elevation of part of the controlling-lever, showing the inclined plate thereon. Fig. 22 is a side elevation of parts, showing the arrangement of the voting-keys, the connected push-plates, and other associated parts. Fig. 23 is a plan of a tens or a hundreds counter, Fig. 24 being an edge view of the same seen as indicated by arrow in Fig. 23. Fig. 25 is a plan of a units-counter, Fig. 26 being an edge view of the same seen as indicated by arrow in Fig. 25. Fig. 27 is an elevation of interior parts at the left side of the machine, parts being broken out and omitted, the frame and casing being vertically sectioned, as on the dotted line 27 in Fig. 17. Fig. 28 is an elevation of parts of the machine seen from the left, parts being broken away and omitted and other parts shown in various positions by full and dotted lines, the section being on the dotted line 27 in Fig. 17. Fig. 29 is an elevation of interior parts viewed as indicated by arrow 29 in Fig. 18, parts being broken away and omitted, the section being as on the dotted line at the point of said arrow 29. Fig. 30 is an elevation view as in Fig. 29, further showing interior parts, parts being broken away and omitted and other parts shown in various positions by full and dotted lines, the column of push-plates being vertically sectioned, as on the dotted line 30 in Fig. 18. Fig. 31 is an elevation of parts at the right side of the machine, showing the returning-bar and the stop-keys with associated parts, parts being broken away and omitted and other parts shown in various positions by full and dotted lines, the section being as on the dotted line 31 in Fig. 29. Fig. 32 is a vertical section of parts at the bottom and the rear of the cabinet, further showing the mechanism for operating the controlling-lever, parts being shown in various positions by full and dotted lines. Fig. 33 is a horizontal cross-section of the ballot-holder and associated parts, taken on the dotted line 33 33 in Fig. 42, parts being broken away and shown in various positions by full and dotted lines. Fig. 34 is a side elevation of a part of the cells-shaft and receiving-plates. Fig. 35 is a view of the under face of a receiving-plate. Fig. 36 is a plan showing the lock-plate in engagement with the tens and hundreds counters and some associated parts, the section being as on the dotted line 36 in Fig. 27. Fig. 37 is a face view of parts of the lock-plate seen as indicated by arrow 37 in Fig. 36. Fig. 38 is an edge view of the lock-plate seen as indicated by arrow in Fig. 37. Fig. 39 is a view from within the cabinet, further showing the mechanism for locking the counters at the close of an election, the section being as on the dotted line 39 in Fig. 36. Fig. 40 is a horizontal cross-section of the ballot-holder and associated parts, taken as on the dotted line 40 in Fig. 42. Fig. 41 is a side elevation of the ballot-cage and some associated parts seen as indicated by arrow in Fig. 40, the section being as on the dotted line at the point of the arrow. Fig. 42 is an elevation of parts seen as indicated by arrow 42 in Fig. 18, showing the ballot-cage and voting-fingers, with associated parts, parts being broken away and other parts shown in various positions by full and dotted lines. Fig. 43 is a plan of the voting-lever and horizontal toothed rack, with coacting parts, parts being omitted and other parts shown in various positions by full and dotted lines, the walls of the cabinet being horizontally sectioned. Fig. 44 shows in plan the shifting-jaws or shifter for the forks. Fig. 45 is an elevation of the shifting-crank and connecting-link, the horizontal toothed rack being transversely sectioned as on the dotted line 45 in Fig. 43. Fig. 46 is an elevation of parts viewed from the right of the machine, showing the toothed racks and wheel, with associated parts, parts being broken away and omitted. Fig. 47 is an elevation of the toothed racks and wheel, with the fork-carrier and other parts, the view being as indicated by arrow in Fig. 46, parts being broken away and omitted. Fig. 48 is an edge view of a part of the controlling-bar of the fork-carrier seen as indicated by arrow in Fig. 47. Fig. 49 is a plan of a fork with the bars of the carrier transversely sectioned, parts being shown in various positions by full and dotted lines. Fig. 50 is a side elevation of a part of the controlling-bar of the fork-carrier, partly in longitudinal section, showing the arresters for the forks. Fig. 51 is a plan of the public counters and a part of the driving mechanism therefor, parts being shown in various positions by full and dotted lines. Fig. 52 is a side elevation of the public counters and other parts seen as indicated by arrow 52 in Fig. 51, parts shown in various positions by full and dotted lines. Fig. 53 is a rear elevation of the upper cable-wheel and the straights stop-head with associated parts, parts being shown in various positions by full and dotted lines. Fig. 54 shows the cable-wheel and associated parts viewed as indicated by arrow in Fig. 53. Fig. 55 is a front elevation of the straights stop-keys, with parts broken away, the view being opposite to that of Fig. 53. Fig. 56 shows a straights stop-key detached. Fig. 57 is an elevation of the stop-head and adjacent series of straights stop-keys with associated parts viewed as indicated by arrow in Fig. 54, parts being shown in various positions by full and dotted lines and the returning-bar omitted. Fig. 58 is a front elevation showing some of the voting-keys associated with reference to the political parties in the field. Figs. 59 and 60 show push-plates in various positions as moved or adjusted by the corrector. Fig. 61 is an elevation of some of the locking-disks, showing them arranged for one or more votes. Fig. 62 shows a push-plate and coacting voting-finger with associated parts, the finger and the plate appearing in two positions each in full and dotted lines. Fig. 63 is an elevation of parts at the left of the machine, better showing the means for conveniently reading the votes for each party and candidate. Figs. 64 and 65 are elevations of parts, showing the relation between the push-plates and the toothed stop-bar. Fig. 66 is an elevation of the toothed stop-bar in full. Fig. 67 is a vertical section of the upper part of the ballot-holder and some of the voting-fingers, taken as on the dotted lines 67 in Figs. 33 and 40, further showing the mechanism within the ballot-holder, parts being broken away. Fig. 68 is a horizontal longitudinal section of the inner end of the horizontal toothed rack, taken on the dotted line 68 in Fig. 46, further showing the core bearing or support for rack. Fig. 69 is a side elevation of the recessed stop-bar used when women vote, showing its relation with the push-plates, parts being broken away. Fig. 70 is a side elevation of the lower part of the returning-bar for the stop-keys and the upper part of the cam-plate and the connection for the parts seen in the direction opposite to that in which Fig. 31 is seen. Fig. 71 is an edge view of parts of the mechanism for returning the straight stop-keys. Fig. 72 is an elevation of the mechanism for holding the fork-carrier in its normal position, parts being broken away. Fig. 73 is a side elevation of the fork-carrier with parts broken away. Fig. 74 is a transverse section of the fork-carrier on the dotted line 74 in Fig. 73. Fig. 75 is a vertical section of a part of the cabinet, further showing the mechanism for operating the returning-bar for the straight stops. Fig. 76 is a side elevation of the recessed stop-bar for woman voting, parts being shown in two positions by full and dotted lines. Fig. 77 is a side elevation of a part of the stop-bar for woman voting, more fully showing the actuating-rod therefor, parts being sectioned and broken out. Fig. 78 is a horizontal transverse section of the cabinet, just beneath the top cover, taken as on the dotted line 78 in Figs. 1 and 27, showing the interior parts in plan. Fig. 79, detached, shows in side elevation the stud holding the upper end of the alining-bar, the vertical section being as on the dotted line 79 in Fig. 78. Fig. 80 is a horizontal section on the dotted line 80 in Fig. 79, showing the stud in plan. Fig. 81 is a horizontal cross-section of the cabinet through the axis of the lower cable-wheel on the dotted lines 81 in Figs. 46 and 47, showing in plan the parts beneath. Fig. 82, detached, is a plan view more fully showing the manner of supporting the fork-carrier and the connecting-bar $c'$, the section being the same as in Fig. 81. Fig. 83 is a vertical section of a part at the bottom of the cabinet, taken as on the dotted line 27 in Fig. 17, further showing in side elevation the manner of operating the detent or alining bar, parts being shown in various positions by full and dotted lines. Fig. 84, detached, further shows in elevation the slotted link or elbow actuating the alining-bar and the standard holding the same. Fig. 85 is a vertical section of the lower part of the cabinet, taken as on the dotted line 85 in Fig. 81, further showing the manner of supporting the fork-carrier, parts being omitted and broken away. Fig. 86 is a vertical section of a part at the bottom of the cabinet, taken as on the dotted line 27 in Fig. 17, further showing the mechanism for raising and depressing the counters, parts being broken away and vertically sectioned as on the dotted line 86 in Fig. 81. Fig. 87 is a plan of the horizontal toothed rack and shifter for the fork-carrier, the horizontal section of the cabinet being just above said toothed rack, as on the broken dotted line 87 in Fig. 46. Fig. 88 is a plan of the base-wheel and some associated parts, better showing the action of the dogs upon the lever for controlling the counters. Figs. 3, 7, 10, 13, 20, 23, 26, 33, 35, 39, 41, 45, 48, 50, 55, 56, 61, 64, 65, 74, 79, 80, 84, and 86 are drawn about full size. Figs. 14, 15, and 16 are drawn double size and the remaining figures to scales less than full size.

Referring to the drawings, A, Figs. 1, 2, 4, 5, and 6, is a metal inclosing case or cabinet containing most of the working parts of the machine, C being the floor, all resting upon suitable legs or supports E.

F is a horizontal base-wheel on the floor C, turning on a stud $b$, rigid with the floor.

G, Figs. 2, 4, 5, 17, 18, 28, 29, and 30, is a returning-lever fulcrumed in an offset through a wall of the cabinet and engaging at its lower end a stud $d$ of the base-wheel, as seen clearly in Figs. 17 and 18, by means of which to turn the latter.

H I K, Figs. 8, 9, 18, and 27 are series of units, tens, and hundreds counters, respectively, arranged in three vertical columns extending substantially from bottom to top of the cabinet.

P, Figs. 18, 19, and 22 are a series of push-plates arranged horizontally in a vertical column between standards H' in position to engage the units-counters H.

L M, Figs. 1, 3, 18, 22, and 58, are voting-keys arranged in two vertical columns in front of the cabinet, each key being connected with a push-plate, as shown.

V, Figs. 1, 5, 6, 43, and 46, is a lever for voting simultaneously all the candidates of a political party.

U, Figs. 1, 18, 31, 55, and 57, are a series of straight party-stops, one for each political party, arranged in a vertical row in front, any one of which pushed in determines the party-ticket voted by means of the voting-lever V.

N, Figs. 9, 18, 27, and 30, is a lock-plate held on a vertical shaft $f$ to engage the vertical rows of the tens and the hundreds counters to hold them against being altered or moved.

O, Figs. 17, 18, 27, 28, and 29, is a vertical return-bar for the series of push-plates P, engaging extensions $a$ of the latter, directly operated by a controlling-lever R, Figs. 17, 18, 27, and 28.

S is a vertical detent-bar for the series of units-counters H, operated indirectly by the base-wheel F to accurately aline said counters and hold them against being moved out of place by the push-plates when returning to their normal places.

W, Figs. 18, 31, and 54, is a returning-bar for the straight stops U, adapted to engage lateral extensions $c$ of the stops, operated indirectly from the returning hand-lever G.

X, Figs. 18, 29, 43, 46 to 50, and 73, is a vertical fork-carrier pivoted at top and bottom in bearings and adapted to be turned horizontally through short distances indirectly by the voting-lever V to move or vote the push-plates P.

Y, Figs. 18, 29, 30, 40, 41, 42, 46, 47, 53, 54, and 67, is a vertical sheet-metal ballot-holder within and adjacent to the front wall of the cabinet carrying cable-wheels $g$ $g$, as shown.

Z, Figs. 18, 29, 40, 46, 47, 53, 54, and 57, is a cable on the wheels $g$ $g$ for directly operating the fork-carrier X and the stop-head A', Figs. 47, 53, 54, and 57.

B', Figs. 18, 27, and 29, is a series of locking-disks in a vertical column held to turn on a rigid rod $e$ and connected with extended parts $i$ of the push-plates P by connecting strips or rods $h$.

C' and D', Figs. 18, 33, 40, 41, and 42, are respectively pairs of vertical guide-bars within the compartment Y, holding a series of voting-fingers $l$ in positions to engage branches $m$ of the push-plates P, Figs. 18, 19, and 62, by means of which either one of the push-plates or its engaging finger may be returned to its normal place by moving the other.

E', Figs. 18, 33, 34, 40, and 42, is a vertical shaft in the ballot-holder Y, holding a series of receiving-plates $n$ for receiving written cardboard tickets $o$.

F', Figs. 18, 40, 41, and 42, is a receptacle or ballot-cage in the compartment Y, held to turn on trunnions for primarily receiving written ballots.

G', Figs. 18, 28, 62, 64, 65, and 66, is a vertical toothed stop-bar for the push-plates P, the teeth of which, acting upon branches $r$ of the push-plates, serve as stops to control the voting-keys M and L.

The counters H I K, Figs. 18, 23 to 26, and 69, are circular in form, made preferably of sheet metal, each having twenty about equal upturned parts $s$ $u$, arranged in outer and inner circular series, ten in each, as shown, the inner ones, $u$, bearing upon their outer faces progressively the figures "0" to "9," inclusive. Between each two adjacent parts $s$ of each counter is a space $v$, in which spaces of the units-counters H branches $w$, Figs. 18, 19, and 22, of the push-plates P strike to turn the counters forward when the voting-keys M L or the push-plates P are pushed inward by a voter in the act of voting. These counters H I K are arranged in three parallel vertical columns, Figs. 8, 9, 17, 18, and 27, and held to turn on shafts $p$, they being arranged in horizontal triplets connected by yokes or ties $t$, Figs. 7, 36, 51, and 69, each triplet comprising a units, a tens, and a hundreds counter, as shown. For each units-counter there is a push-plate P, so arranged that in voting any of the keys M or L, Figs. 1, 5, 18, and 62, in the two vertical rows by pushing the same inward the counter will be turned. Each of the units and the tens counters is formed with a tooth $y$, Fig. 18, which teeth respectively turn the next adjacent counters in the usual manner when the teeth come around, the three counters in each triplet indicating any number from "0" to "999," inclusive, as the case may be.

In making up or preparing the machine for use at any given election there is a key in one or the other of the two vertical columns of keys L M, Fig. 1, devoted to each of the political parties in the field, the names of the parties appearing on slips of paper or tickets passed into the ticket-holders $k$, associated with the party-keys, respectively. There is also a key in one column or the other devoted to each individual candidate of all the parties contesting, the names of said candidates appearing on tickets held by the various ticket-holders $k$, connected with the said respective keys. There are also other keys in the two columns for such grouping of candidates as may be required, and still others for the use of women to vote, and as every key of both vertical rows has its push-plate and triplet of counters the latter will indicate the whole number of times the key has been pushed in or voted—that is to say, the several horizontal sets or triplets of counters in the columns will indicate the whole number of votes cast for each political party separately and for each candidate of all parties voted singly or in groups, the numbers being all read at the left face of the machine, as already stated. Furthermore, any keys pushed inward or voted by mistake or otherwise may be again drawn out or unvoted and other keys voted instead, which likewise may be done in case of change of purpose on the part of the voter, the vote being registered and beyond recall or change only when the returning-lever G is swayed, as already stated, to return all parts of the machine to their normal places and positions ready for another voter.

As stated, the shifting of the returning-lever G forward and then back, as indicated in Fig. 5, serves to turn the base-wheel F, Fig. 17, upon its bearing through a part of a revolution and then back. This wheel carries a series of bodies or projecting parts, which act upon various movable parts of the machine to effect prearranged results. For example, it sometimes occurs that from one cause or another some of the voting-keys are pushed only part way in or back by the voter, leaving the associated push-plates and counters in disorder or in positions that indicate no vote or count. To meet this difficulty, a correcting-blade T, Figs. 17, 18, 27, 29, 30, 59, and 60, is provided, actuated primarily by a cam $z$, Figs. 17, 20, 29, and 30, on the base-wheel. Coacting with the cam is a bar $a'$, provided with a roller $b'$ to traverse the sinuous channel of the cam when the wheel turns. A bar $c'$ connects the bar $a'$ with a pin $d'$ of the blade T, and a holding-bar $e'$, pivoted to a stud $f'$, Figs. 81 and 82, secured to the casing, is joined to the bar $a'$. The bar $c'$ is loosely pivoted on a stud $g'$, Fig. 82, rigid with the casing of the cabinet, and all the joints of the bars $a'$, $c'$, and $e'$ are free to move. From this description of the parts it will be understood that as the turning of the wheel F carries the cam $z$ around the roller $b'$ will be carried beneath the point $k'$, Fig. 20, and then up again to the point $l'$. This will cause the blade T to first rise and then descend to its normal place. (Shown by full lines in Fig. 30.) The blade is formed with inclined slotted ends $h'$, occupied by studs $i'$, rigid with the casing, so that as it is moved upward along said studs it will also move laterally to the right and engage the push-plates P to correct their positions. This will be clearly understood by inspecting Figs. 59 and 60, in which the keys are shown as only partly pushed in or improperly voted, leaving the push-plates standing in awkward positions midway between the holding-standards H', as shown. The push-plates are formed with pointed branches $n'$ opposite the edge of the correcting-blade, so that when the latter is moved forward, as stated, it will encounter said branches on one side or the other and so either return the plates and the voting-keys to their normal positions (shown by dotted lines in Fig. 59) or to their voted positions, (shown by dotted lines in Fig. 60,) as the case may be. It will furthermore be understood by inspecting Fig. 17 that on account of the relative positions of the cam $z$ and the roller $b'$ this action of the correcting-blade will take place during the early part of the movement of the base-wheel effected by the lever G—that is to say, the correcting of the positions of the voting-keys and the counters that may be out of place is one of the first things accomplished by the wheel.

To return all the keys and the push-plates that have been voted at any time to their normal places a vertical returning-bar O, Figs. 17, 18, 27 to 29, is employed, held to slide obliquely on holding-studs $m'$, Figs. 78 and 81, occupying inclined slots $p'$ in the bar O. The push-plates are formed with extended parts $a$, projecting through an angular part of the inner standard H' in position to be encountered by the edge of the bar O as the latter moves forward. This bar is actuated by a bent controlling-lever R, projecting at the rear side of the cabinet and moved either by hand or by the base-wheel F, as the case may be. The lever R is joined to the bar O on a pin $o'$, and as the lever is moved endwise in either direction it will cause the bar to move either forward against the push-plates or back to its normal position, as may be. The lever is provided with an inclined piece $r'$, Fig. 21, on the side next the base-wheel, the latter having a roller $s'$ in position to strike under the part $r'$ as the wheel is turned. This will serve to simultaneously both raise the lever and carry it forward with the bar O, and so return all the push-plates P and the voting-keys to their normal places each time the wheel is turned forward by the lever G. The lever R is formed with a notch $t'$, Figs. 27 and 28, which when the lever is moved inward, as described, catches onto the guide-plate $u'$, through which it passes and so becomes locked or held to place, keeping the bar O temporarily in position to prevent any of the keys M L being voted. This action of the base-wheel, it will be observed, takes place just before the wheel stops in its forward motion, the roller $s'$ remaining temporarily under the incline $r'$. The roller $s'$ stands normally some distance away from the inclined part $r'$ and reaches the latter only after the wheel has gone through most of its forward motion and is about to stop. The part R serves also as a hand-lever for use by the attendant inspector, who each time after the wheel has been turned forward and back by the lever G releases it from the guide-plate $u'$ and draws it back to the position shown by full lines in Fig. 28 to free the push-plates ready for another voter.

It is essential that each time after a voter has manipulated the machine—properly or imperfectly—all the working parts thereof be returned accurately to their respective normal places and positions before another voter begins to operate the machine, and, as has been stated, the general returning-lever G, with its coacting parts, is provided for that purpose. After the voter has completed his vote by pressing the keys or manipulating other voting parts of the machine he, in order to finally make good or clench his vote, pulls said lever fully forward to the position shown by dotted lines in Fig. 5, and then to unlock and reset the parts he pushes the lever fully back to its normal position, (shown by full lines in the figure;) but this act of swaying the lever is itself also liable at times to be improperly or imperfectly done by hasty or careless voters, which circumstance has also to be provided for in constructing the machine. The mechanism is accordingly arranged to prevent the lever being pulled part way forward and then returned to its normal place and also to prevent all action of the voting mechanism until the lever has been properly moved and returned to its normal place, setting everything else right.

A crab or part I', Figs. 17, 18, 28, and 32, is provided upon the floor C of the cabinet in position to pass under the controlling-lever R when in its raised or locked position given it by the roller $s'$ and temporarily hold it from being moved. This crab is formed with horns $x'$ $x'$ and held to turn on a stud $v'$, rigid with the floor C, being actuated indirectly by the base-wheel. A thrust-bar K', resting upon the floor, is formed with a finger $w'$ in position to move between and engage alternately the horns $x'$ to turn the crab one way and the other as the wheel is turned, a stop-pin $v^7$ being provided to arrest its motion in one direction. A slotted arm $y'$, rigid with the thrust-bar K', reaching over the base-wheel, is connected therewith by a pin $z'$, so that when the wheel is turned forward or back by the lever G, Fig. 17, the bar K' will move endwise to turn the crab, as shown in the figure. The crab has an upturned cam-shaped part $a^2$, Figs. 18, 28, and 32, which is carried under the lever R to press it upward when the wheel is turned forward, this taking place simultaneously with the lifting of the lever by the roller $s'$, as already described, and it will be observed that on account of the space between the horns of the crab traversed by the finger $w'$ of the thrust-bar the crab will not be shifted to release the lever until the wheel is just about to stop in its return motions. Thus after the push-plates P are all returned to their normal places by the forward turning of the wheel, as already described, they, with the voting-keys, are held motionless until the wheel has been again returned to its normal position. This releasing of the lever R is one of the last acts performed by the returning-wheel, this taking place after all the other parts of the machine have been returned to place.

The thrust-bar K' is formed with teeth $b^2$, in position to be engaged by a pawl $d^2$, Figs. 17, 18, 29, and 32, which pawl acts normally to prevent the bar from moving retrogressively or toward the left, but permits free motion of the bar forward or toward the right. As the thrust-bar is moved forward by turning the lever G the pawl will drop successively into the notches $b^2$ and prevent a return of the bar and the lever G until the latter has been drawn through a complete forward stroke. A lifter $c^2$ is provided for the pawl to hold it away from the thrust-bar at the proper time, so the latter and the lever G may both return to their normal places. This lifter is held to turn on a pin $e^2$ and is actuated by an arm $f^2$, rigid with the thrust-bar to engage a pin $g^2$ of the pawl, as shown. The arm $f^2$ is formed with horizontally-projecting parts $h^2$ $i^2$, Figs. 17 and 18, on either side of the lifter, so that when the thrust-bar is moved forward the part $h^2$ will turn the lifter up against the pin $g^2$, Fig. 32, and so lift the pawl out of engagement with the thrust-bar, and when the latter is moved back to its normal place the part $i^2$ of the arm will tilt the lifter, Fig. 29, allowing the pawl to again engage the thrust-bar. The wide space between the parts $h^2$ and $i^2$ allows the base-wheel to nearly complete its forward motion before the pawl is lifted from the thrust-bar and to practically complete its return motion before the pawl is allowed to again engage the bar.

It has been stated that the branches $w$ of the push-plates P, Figs. 18 and 19, act against the upturned parts $s$, Figs. 25 and 26, of the units-counters to turn the latter forward when the push-plates are moved forward in the act of voting. Any key pressed inward by a voter may be pulled out again, the coacting counter turning back with it; but when the voter has determined his vote and wishes it to stand the returning of the push-plates by means of the lever G must not turn back or disturb the counters, for they must remain temporarily fixed to indicate the vote cast. To cause the push-plates to avoid the counters in their final return movements, provision is made to drop or depress the counters bodily by the action of the base-wheel to permit the push-plates to pass them untouched. The three shafts $p$, holding the counters, pass at their lower ends freely through a guide-plate or stand $k^2$, being stepped rigidly in a horizontal foot-plate $l^2$, Figs. 17, 18, and 27, beneath the stand, as shown. This foot-plate is formed beneath with a downwardly-projecting ring $m^2$, passing over a short vertical cylindrical post $n^2$, adapted to turn in horizontal directions in a bearing or holder $p^2$, rigid with the floor C of the cabinet. A lever $o^2$ passes horizontally through the post $n^2$, reaching over the base-wheel F, as shown, in position to be moved to turn the post alternately by a pair of dogs $r^2$ $s^2$ on the wheel as the latter is turned forward and back by the lever G. The lever $o^2$ also passes through both sides of the ring $m^2$, occupying spiral slots $t^2$ therein, on account of which when the post is turned by the wheel the foot-plate and the superincumbent counter-shafts and counters will fall and rise alternately, the shafts sliding vertically through the upper and the lower guide-plates $u^2$ and $k^2$, Fig. 27. When the wheel turns forward, the dog $r^2$, carrying the lever $o^2$ to the position shown by dotted lines in Fig. 17, the body of counters H I K will be depressed and so remain until the wheel returns, the dog $s^2$ restoring the lever to its normal position and raising the counters to place. The upturned parts $s$ of the units-counters H, Figs. 25 and 26, are made short, so that when the counters are depressed, as stated, the branches $w$ of the returning push-plates will pass over the parts $s$ without moving the counters. The dog $r^2$ being in advance of the roller $s'$ on the wheel will cause the counters to be depressed in advance of the returning of the push-plates to their normal places by the wheel, as stated. On account of the distance between the dogs when the counters are depressed they remain so for a considerable period of time, giving ample time for the push-plates to pass over the parts $s$ in their return movements.

The yokes or ties $t$, Fig. 7, for the counters are pierced by the shafts $p$, each yoke being formed with three shallow cups or circular inclosures $v^2$. When the parts are put together, each yoke is inverted over a triplet of coacting counters, the cups $v^2$ covering the inner upturned parts $u$ of the counters, as shown in Fig. 36. The contact of the yokes with the counters produces a slight tensional friction, serving to hold the counters steadily in place, so as to be easily read through the vertical slits $w^2$, Figs. 8 and 9, in the left side of the machine. Also to guard against backlash for the units-counters that might be sometimes produced by jarring of the machine or from other cause and to make it further certain that said counters shall always be in position to properly receive the action of the push-plates a vertical detent-bar S, Figs. 17, 18, 27, 28, 52, 78, 79, 80, and 81 is employed to control said counters. This bar is in position to have its edge pass into the vertical row of spaces $v$ of the units-counters adjacent to it when it is moved forward, enabling it to hold the spaces of all said counters truly and still in vertical lines while other parts of the machine are moving. This detent-bar is obliquely slotted at its ends, as shown, and held to move along fixed studs $z^2$, Figs. 27, 28, 78, 79, 80, 81, and 83, occupying the slots. Its motions are alternately obliquely forward and upward and downward and backward, as motion is given it. This bar S is operated by the base-wheel through intermediate mechanism, including the lever $o^2$, Figs. 17, 18, 27, 28, 30, 78, and 81. A horizontal slotted bar $x^2$ is connected with the detent-bar by means of a bent slotted link or elbow $y^2$, Figs. 17, 28, 78, 81, and 84, the lever $c^2$ passing through the slot in the bar $x^2$ and the link $y^2$ being supported by a standard $c^8$, rigid with the floor of the cabinet. By these means the base-wheel as it turns forward throws the bar S against the units-counters for the purpose stated. The slot in the bar $x^2$ is of considerable length, on account of which the detent-bar S remains idle until the forward motion of the wheel is nearly completed or until the lever $o^2$ traverses the slot and bears at the forward end thereof. The detent-bar is thus brought into position against the counters only after the latter have been turned by the voter and before the returning-bar O begins to act upon the push-plates, as above described. This alternation or succession of action of the detent-bar S and the returning-bar O is effected by forming the lever $o^2$ with a slight bend $d^3$, as clearly shown in Fig. 88. The dog $r^2$, when carried against the lever $o^2$ by the wheel F, will advance the lever to its extreme forward position, (shown by full lines in the figure,) when its action upon the lever will cease, the oblique offset bend in the lever admitting of the dog to continue its advance motion without further affecting the lever. When the lever is in this position, the bar S will be in contact with the opposing counters, temporarily holding them against being further moved or changed; and as the wheel F continues to complete its forward motion it will, after the lever $o^2$ has stopped, move the returning-bar O against the push-plates, as stated. By observing the relative positions of the dog $r^2$ and the roller $s'$ in said Fig. 88 it will be noted that the roller does not encounter the incline $r'$ to move the bar O until the dog $r^2$ has finished its action against the lever $o^2$—that is to say, the counters are engaged by the bar S and held immovably before the push-plates are pressed by the bar O back to their normal positions.

When a key M L of the vertical series standing for any political party is pressed in or voted, the triplet of counters associated with the key will indicate one vote cast for said party. Mechanism, however, is provided in the machine for voting by two movements of a lever every individual candidate of any party simultaneously when it is wished by the voter to vote a full straight ticket, the counters for the different candidates all turning simultaneously to indicate a vote for each. A series of forks $a^3$, Figs. 18, 29, 43, and 46 to 50, is provided for engaging the branches $r$ of the push-plates P, by means of which the latter may be moved in the act of voting the same as they are moved by the keys M L already described. These forks are held in horizontal positions by a vertical carrier X, Figs. 18, 29, 46 to 50, 73, and 74, held to turn in horizontal directions on vertical end trunnions $b^3$, Figs. 29 and 73, the lower one having bearing in a rest $f^5$, Figs. 29, 73, 78, 81, and 85, near the floor of the cabinet. This carrier for the forks comprises a middle longitudinal bar $c^3$, rigid with the trunnion-heads $d^3$, a second longitudinal slide-bar $e^3$, and a vertical swinging bar $f^3$, all parallel and in the same vertical plane. The bodies of the forks are open, as shown in Fig. 49, the bars $c^3$ and $e^3$ occupying the openings, with the bar $f^3$ outside and at the ends of the forks. The bar $e^3$ is provided with vertically-adjustable guide-pieces $g^3$, Figs. 47 and 48, for holding and controlling the forks $a^3$, which are adapted to slide longitudinally between the guides. When moved forward to the position shown in Fig. 47 and by dotted lines in Fig. 49, the tines $r^3$ $s^3$ of the forks are in position to engage the branches $r$ of the push-plates when the carrier X is turned on its trunnions, as clearly shown in Fig. 43, said branches being between the tines. When the forks are back or to the position shown by full lines in Fig. 49, the tines are out of the way of the branches of the push-plates, so the latter may freely move.

The fork-carrier X is turned on its trunnions by means including a bifurcated shifter B, Figs. 43 and 44, held to turn in horizontal directions on a pivot $h^3$ of a bracket $i^3$, secured to the casing of the machine. This shifter is provided at the ends of its branches with long vertical bars or strips $k^3$, Figs. 43, 44, 46, and 47, having parallel inner edges in positions to bear against the forks $a^3$, as shown, to turn the carrier X. The hand-lever V, Figs. 1, 4, 5, 43, and 46, is rigid with a horizontal cylindrical toothed rack D, held to both turn and slide longitudinally within a bearing $m^3$, secured to the casing or side of the cabinet. The inner end of this rack is held upon a bearing $l^3$, Figs. 43 and 68, having a stem occupying a longitudinal cavity in the rod, as shown, upon which the latter may both turn and slide longitudinally. The rack is formed with a longitudinal groove $z^3$ and provided with a crank L', Figs. 43, 45 to 47, having an internal rib $b^4$ to occupy the groove, so the crank must turn with the rack, the latter being adapted to slide longitudinally through the crank. The crank is connected with a pin $n^3$ (see Fig. 44) of the shifter B by a link $o^3$, so that when the lever V is turned by the voters, as indicated in Fig. 1, the shifter will be turned to the position shown by dotted lines in Fig. 43. This will serve to swing the fork-carrier and the forks in a manner to move the push-plates to their voted positions and turn the connected counters accordingly, thus showing a vote on the counter for each push-plate.

In preparing the machine for an election a fork is provided for each office to be filled—that is to say, if there are, for example, twelve candidates on each party-ticket twelve forks will be placed on the carrier X. These forks are distributed along the bar $e^3$ so as to coact with the push-plates devoted to the several candidates of any party when in position to act for such party, so that when the voting-lever V is turned down by the voter, as stated, a vote will be cast simultaneously for each individual candidate of the party, the counters for said candidates being each advanced one. If there are, for example, five parties in the field each having ten candidates, ten forks $a^3$ only will be employed on the carrier X, provision being made for using these ten forks for voting the candidates of all the five parties. This is effected by shifting the bar $e^3$ of the fork-carrier X in vertical directions to bring the various forks opposite and in positions to engage the push-plates connected with the keys M L devoted to the different individual candidates. Thus by first bringing the bar $e^3$ to a position in its vertical movements, in which the tines $s^3$ of the forks will act upon the proper push-plates for voting the candidates of any particular party desired, and then turning the lever V down, as stated, all the candidates of said party will be simultaneously voted. Also after the lever has been thus turned down to vote the push-plates the latter may be all readily unvoted by turning the lever correspondingly upward above a horizontal position should the voter change his mind and wish to vote differently, the tines $r^3$ of the fork acting in this instance to return the push-plates to their normal or unvoted positions. By means of this mechanism the time employed for each individual in voting is very much shortened and the voting expedited, for by a single sweep of the lever V all the candidates of any given political party are voted at once instead of the voter having to hunt along the two vertical rows of keys for the names of the candidates wanted, all of every party appearing on strips of paper slipped into the ticket-holders $k$, and pressing each key separately.

When the bar $e^3$ of the fork-carrier X is moved or adjusted vertically for the purpose stated, it moves upon vertical longitudinal guide-pieces $c^4$, Figs. 29, 73, and 74, rigid with the trunnion-heads $d^3$, occupying corresponding longitudinal cavities in the ends of the bar $e^3$, as shown. These vertical movements of the bar $e^3$ are effected by means including a cable Z, Figs. 18, 29, 46, 47, 53, 54, and 57, held to run in vertical directions on pulleys $g\ g$. The two extreme ends of the cable are secured to the bar $e^3$ of the fork-carrier by pins $p^3$, Fig. 47, the opposite ends of the cable being connected to the two ends, respectively, of a vertical toothed rack M' by couplers N' N', which completes the circuit of connected parts passing around the pulleys $g\ g$. The two racks D and M' cross near each other, as appears in Figs. 46 and 47, an intermediate pinion O' being provided, engaging the teeth of both racks. From this description of the parts it will be understood that if the lever V be pulled laterally outward the rack M' will be carried correspondingly upward. This will serve to depress the bar $e^3$ more or less, according to the distance said lever is drawn out, and a pushing inward of the lever will, on the other hand, serve to lift the bar $e^3$. As the latter is thus moved in vertical directions it will bring the forks $a^3$ opposite different sets of push-plates, and so, as has been stated, in position to vote candidates of different parties.

To enable the voter to move or adjust the bar $e^3$ with precision to vote the candidates wished in any given case, a series of straight-party stops or keys U, Figs. 1, 4, 5, 18, 31, and 53 to 57, is provided at the front of the machine. There is one stop-key for each political party, with the name of the party opposite the key, as shown in Fig. 55, these keys being adapted to be pressed inward by the voter in the same manner the voting-keys M L are operated, as already described. These stop-keys extend into the interior of the cabinet, each being provided therein with a lateral pin $c$, Fig. 56, in position to be encountered by a returning-bar W to return the keys to their normal places after being used by a voter to determine his vote. A vertical shaft or stop-head A', Figs. 53, 54, and 57, is provided, attached to a distant part of the cable Z by a horizontal arm $t^3$, so as to move up or down with said part of the cable as the latter is moved by the lever V, as already set forth. This stop-head is placed near and adapted to move in vertical directions parallel with the inner heads of the row of stop-keys U, so that if any one of the latter be pushed inward the descending stop-head will encounter it and be arrested, as clearly indicated in Fig. 57. Then if a voter wish, for example, to vote for the candidates of the political party for which the stop-key fourth down from the top stands he will first push said particular key inward, as shown, and then draw the lever V outward until its motion is arrested by the head A' encountering the depressed stop-key, as stated. This done the forks are in position to move the proper push-plates to vote the candidates desired when the lever V is turned down, as stated, and it will be noted that a stop-key pressed in by a voter may be withdrawn again and another one pressed in instead should the voter wish to make such change.

The voting-lever V is returned to its normal horizontal position to hold the forks normal by means of a spring-controlled tilting head P', Figs. 43 and 72, pivoted upon a bearing $a^4$, secured to the casing of the cabinet.

$v^3$ is a cross-head having a rod $x^3$ extending centrally within a barrel R' and contained spring $w^3$, which latter tends to hold the cross-head normally down or in the position shown by dotted lines. Rods $u^3$ connect the tilting head with the cross-head, so that when the former is tilted in either direction it will draw the latter upward against the action of the spring. An arm $y^3$ of the shifter B engages the head P' between jaws, as shown, on account of which when the shifter is turned to swing the fork-carrier X, as stated, the head P' will be tilted, and so draw the cross-head $v^3$ upward, as appears in Fig. 72, against the action of the spring $w^3$. By these means the spring tends to hold the lever V and the forks in their normal positions, allowing the free movements of the push-plates, the branches $r$ of which having room between the tines of the forks.

The longitudinal motions of the forks between the guides $g^3$ are controlled in part by the swinging bar $f^3$ of the carrier X, suspended on links $n^4$, Figs. 29, 73, and 74, pivoted at their ends to said bar and the middle bar $c^3$, respectively. The bar $e^3$ of the carrier is provided at its upper end with a hook-arm $p^4$ in position to catch a projecting part $o^4$ of the swinging bar $f^3$, and so raise the latter as the bar $e^3$ is lifted by the cable, and as the swinging bar is thus lifted it will on account of the link connections also swing toward the middle bar $c^3$ and against the rear ends of the forks, pushing them forward in position to engage the push-plates. Normally the swinging bar is held by gravity in its lowest position and back from the bar $c^3$, as shown by dotted lines in Fig. 29, leaving room for the forks to be moved back out of action. These forks when moved forward for action normally so remain unless withdrawn for especial reasons. For example, it sometimes occurs that one or more of the political parties at an election have no nominations for one or more of the offices to be filled. In such case the fork or forks, as the case may be, that move the push-plates for such candidates must not act when the fork-carrier is in position to vote the tickets lacking such nominations. To withdraw such forks from action in such cases, withdrawal-pins $l^4$, Figs. 49 and 50, are provided, removably inserted in openings $m^4$, Fig. 48, in the middle bar $c^3$ of the fork-carrier. These pins are usually formed with two parallel branches, each to enter adjacent holes $m^4$ in the bar $c^3$, and with tapered projecting heads, so that when the forks are carried upward by the bar $e^3$ they will be simultaneously moved backward along the inclined heads of the pins, and so be withdrawn from action, as clearly shown in the figures. These pins are in making up the machine for an election placed in the bar $c^3$ in positions where the forks are not to act on account of there being no nominations, and they take the place of and render unnecessary the use of dummy tickets commonly used with voting-machines. The forks that are thus temporarily thrown out of action by the pins $l^4$ are again brought into positions for action by the swinging bar $f^3$ for voting the ticket of another party, the fork-carrying bar $e^3$ being returned to its normal elevated position each interval after a vote has been cast, and it will be here noted that after a voter has manipulated a stop-key U and coacting mechanism in the act of voting a straight party-ticket he may yet draw back or unvote any of the voted keys M L depressed by the action of the forks and push in or vote in their stead any others of said keys to cast a vote or votes for candidates of other party or parties as he may wish, the machine being constructed to enable an elector to vote independently either as to political parties or to individual candidates.

As has been already stated, the returning-bar W, Figs. 31, 53, 54, 70, and 71, acts to return the stop-keys U that have been depressed to their normal places. This bar is held to move in a vertical plane upon studs $f^4$, occupying inclined slots in the bar, it being actuated indirectly by an arm $d^4$, Figs. 17, 18, 27, 28, and 31, rigid with the returning lever G. This arm is provided at its extreme end with a pin $i^4$ in position to traverse an elongated opening $e^4$ in a vertical plate S', Figs. 17, 18, 28, 31, 70, and 71, so that as the lever is swayed to return the parts to their normal places it will also move said plate and the returning-bar W, the latter by means of the connecting-strip $g^4$. The plate is guided in its vertical movements by a stud $a^4$, occupying a slot $h^4$ near the upper end, and a slotted post $e^5$, rigid with the floor C of the cabinet at its lower end. The opening $e^4$ being long vertically, the plate S' is not moved by the descending arm $d^4$ until its pin $i^4$ traverses the opening and bears at the lower end, when the plate will be carried down with the remaining motion of the arm, as indicated by dotted lines. By means of the slotted strap $g^4$, connected with the plate on a pin $k^4$, Fig. 70, the bar W receives a motion just sufficient to push the stop-keys U out to their normal places. A bar or strap of iron $a^5$, Figs. 17, 31, 42, 47, 70, and 75, connected with the lower cable-coupler N′, extends downward nearly to the floor C, being movably connected at its lower end with a fixed slotted guide-post $g^5$, so as to have motions in vertical directions with said coupler. This strap crosses near the arm $d^4$, having a pin $h^5$ projecting beneath the arm in position to be encountered by the latter when it moves downward. When the lever V is pulled outward, the strap or rod $a^5$ will be drawn upward, but will be again depressed, bringing with it the rack M′, by the arm $d^4$ in its return movements, resulting in drawing the lever V back near the cabinet to its normal position and the bar $e^3$ of the fork-carrier to its upper normal position each time the returning lever G is swayed, as already set forth. Provision is made, furthermore, for voting for individuals for office who have received no nominations, or "stump" candidates. The series of fingers $l$, Figs. 18, 33, 40, 41, 42, 62, and 67, are formed with horizontal openings $r^4$, one opening in each alternate finger, through which to pass printed or written cardboard tickets $o$, Figs. 33 and 67, into the ballot-holder Y. These fingers are respectively in the horizontal planes of the push-plates P and in positions such that when moved forward they will engage branches $m$ of the push-plates, as appears in Fig. 62. Ordinarily the fingers stand as shown in Fig. 42, the openings $r^4$ being back of the outer narrow guide-bar D, so that tickets cannot be passed through them. Each finger having an opening is pierced with a hole $s^4$ to receive an operating-pin $t^4$, Figs. 18, 33, 40, and 67, for the voter to move the finger longitudinally forward into position for voting, (shown by the finger fifth from bottom in Fig. 42 and by dotted position in Fig. 62,) the opening then being uncovered. By inspecting the latter figure it will be seen that if a finger and its companion push-plate both occupy their normal positions either may be moved by the voter for the purpose of voting without regard to the other; but if either be moved to its advance or voted position the other cannot be moved to its voted position without returning the first to its normal position on account of the inclined forms of both the parts directly engaging each other during these movements. Two or more of these fingers are tied together or bunched to move as a single body by vertical tie-pins, one being shown at $u^4$ in Fig. 42 joining five fingers into a single body. But one pin $t^4$ is employed for moving a bunch of fingers inserted in a hole $s^4$ of the bunch. When a bunch of fingers is moved forward, (to the left as appears in Fig. 42,) any one of the openings $r^4$ of the bunch may be used through which to pass the tickets $o$; but only one is at the service of the voter, the others being covered by sheets $v^4$, of cardboard, Fig. 1, with a single horizontal slit $w^4$ opposite said single opening of the bunch. These slits $w^4$ are enlarged, as shown at $x^4$, to make room for the pins $t^4$. In case of two political parties contesting two fingers will be joined, so that when moved to positions for voting the two push-plates devoted to the parties will both be held inactive or out of use, the ticket $o$ passed through the uncovered opening $r^4$ constituting the vote of the elector. Three fingers are tied together for three parties, &c., one finger being employed for each party, the result of the depositing of these tickets not appearing on the counters H I K.

When a ticket $o$ is passed into the ballot-holder Y through an opening $r^4$ in the fingers $l$, as stated, it primarily enters a cell or pocket $y^4$ of a circular receiving-plate $n$, Figs. 18, 33 to 35, and 40. These receiving-plates are arranged upon a vertical shaft E′, Figs. 18, 29, 30, 33 to 35, 40 to 42, and 67, there being one for and opposite each opening $r^4$ when the finger is moved into position for voting, as stated. This shaft E′ is provided with a crank $z^4$ below the ballot-holder Y, actuated by a bent lever or elbow T′, Figs. 17, 29, 30, and 42, pivoted at $b^5$ to turn substantially in a vertical plane. A strap or rod $c^5$ connects a projecting rest $d^5$ of the plate S′ with the lever T′, on account of which when said plate is moved in vertical directions by the arm $d^4$, as stated, the lever T′ will be moved from one to the other of the two extreme positions shown, respectively, by full and dotted lines in Fig. 42. These forward and back motions of the lever will turn the shaft E′ one way and then the other through parts of a revolution. When turned to the left, as appears in Fig. 33, the corners of the tickets will be brought in contact with the wall of the inclosure Y and pushed out of the cells $y^4$, the tickets dropping to the bottom of the holder Y.

For depositing a written or printed cardboard ticket for presidential electors a ballot-cage F′ is provided within and at the top of the ballot-holder Y, Figs. 18, 40 to 42, and 67, in which to primarily insert the ticket. This cage is held to turn through short horizontal distances on a vertical axis $i^5$ in the holding-frame $t^5$, secured to the side of the ballot-holder Y, and it is formed with a vertical slit $k^5$ in the front curved plate or side $n^5$, through which to pass the ticket $l^5$ when the cage is in the proper position. The edge of the plate $n^5$ of the cage is near the fingers $l$, and a bent pin $o^5$ is inserted in the rear end of the upper finger, in position to pierce said plate, as shown in Figs. 33, 40, and 42. On account of this connection, when the upper bunch of five fingers devoted to the five political parties is moved forward by the voter by means of the pin $t^4$, as already described, the cage will be turned forward to the position shown in Fig. 33 and by dotted lines in Fig. 40. In this position the cage is ready to receive a ticket $l^5$ through the slit $k^5$, a corresponding slit $m^5$ being formed in the swinging door or cover U', Fig. 1, through which to pass the ticket. The cage is formed with a narrow partial floor $p^5$, which when the cage is swung forward, as stated, meets a rigid partition $r^5$ of the ballot-holder Y, upon which floor the inserted ticket temporarily rests. The rear vertical wall $y^5$ of the cage is pierced by two bent wires $s^5$, Figs. 40 and 41, held rigidly in the frame $t^5$, which serve to dislodge the ticket and cause it to drop through the opening $u^5$ at the bottom of the cage when the latter is turned back to its normal position by means of the lever G. A latch $v^5$, Figs. 40 to 42, is provided to temporarily hold the cage in its forward position, so to prevent a voter from swinging the cage forward and back to insert a plurality of tickets, the first ticket inserted filling the slit so another cannot be inserted until the first is discharged, as described. This latch is pivoted at $w^5$ to the frame $t^5$ to swing slightly in vertical directions and passes through an opening $x^5$ in the rear wall $y^5$ of the cage, Figs. 40, 41, 42, and 67, and so onward near the shaft E'. This latch is formed with a notch $a^6$ in its upper edge and provided with a small horizontally-extended part $z^5$ at its lower edge, in position to be encountered by the upper edge of the ticket $l^5$ when pushed into the cage to slightly raise the latch from the position shown by dotted lines to the position shown by full lines in Fig. 42. When the cage is swung forward for voting, the notch will be opposite the edge of the opening $x^5$, and the lifting of the latch by the ticket will cause the notch to engage the plate $y^5$, and so temporarily hold the cage from moving. The latch is again depressed to its normal place to release the cage by a cam $b^6$ on the shaft E', when the latter is turned, as above stated, the latch being slightly pressed into the yielding edge of the ticket by this action of the cam.

For convenience in this specification it has been assumed that five political parties are contesting at an election, the names of the parties appearing as in Figs. 54 and 58. The upper five keys M L, with their coacting mechanism, are devoted to said parties, respectively, as shown, the upper five fingers $l$, Fig. 42, being bunched to coact with the corresponding push-plates of said five keys. In the make-up of the machine but one slit $m^5$ or $w^4$, Fig. 1, through which to pass a card ticket $l^5$ or $o$, as the case may be, will be at the service of the voter, to the end that only one ticket may be passed into the ballot-holder Y by a single voter.

To further control the movements of the push-plates P and regulate the use of the voting-keys M L, a toothed bar G', Figs. 18, 29, 64 to 66, is provided to coact with the push-plates. This bar is held upon studs $c^6$ to move vertically through short distances, the spaces $d^6$ between the teeth being to receive within them the branches $r$ of the push-plates when the latter are pushed forward or voted. This bar is formed with a double tooth $e^6$ to divide it into sections, the ends of the teeth above which being slanted in one direction and those below slanted in the opposite direction, as shown, the double tooth having both slants. Normally this bar stands as shown in Fig. 64, being held in this position by some simple spring or similar well-known device, in which position any one of the push-plates may be advanced or voted by pressing a key M or L without opposition from the bar; but if any one of the upper five push-plates (which may be regarded as one division and those below another division) be advanced it will encounter the slanting end of the opposing tooth of the bar G' and depress the latter sufficiently to allow the plate to pass into a space $d^6$, as shown in Fig. 65; but this depressing of the bar will bring the ends of the teeth of the lower division opposite the respective adjacent push-plates, so that none of the latter can be pushed forward or voted. Likewise, if a push-plate of the lower division be voted the toothed bar will be raised and so prevent the voting of any push-plate above the double tooth—that is to say, if a voter primarily push a key to vote a straight party-ticket he cannot then vote for any individual candidate by pressing a key of the lower division unless first unvoting the original key; nor can he vote a straight party-ticket by pushing a key of the first or upper division after having first voted a key below the double tooth without first unvoting the first key voted. Thus this toothed bar constitutes a lock as between the voting-keys for the political parties and the keys employed for voting "split" tickets.

In preparing the machine for any given election a toothed bar G' is provided having as many spaces $d^6$, less one, above the double tooth as there are political parties in the field, the space above the upper tooth serving for the remaining space for the upper push-plate.

For adapting the machine for women to vote a vertical rectangular controlling-bar V' for the push-plates is provided, Figs. 18, 29, 62, 69, 76, and 77, in position to oppose the branches $r$ of said plates. This bar is held upon rigid studs $f^6$, occupying inclined slots $g^6$, so as to move obliquely downward and forward against the push-plates, as shown by full lines in Fig 69, or upward and backward, as shown by dotted lines, out of the way of all the push-plates. An operating-rod $h^6$, Figs. 18, 69, and 77, secured to the bar V', reaching out at the rear of the cabinet, as shown, enables the inspector to operate the bar for women to vote. This bar is formed with a recess $i^6$ in its front or operative edge, as shown in Fig. 69, which permits certain predetermined push-plates to be pushed in or voted, while holding the rest out of action. The vertical length of the recess $i^6$ may be more or less, movable slotted sections $n^6$, Fig. 76, being secured to the bar in a manner to be moved to overlap and partially cover said recess to reduce its effective length. These sections are held by clamping-screws $o^6$ to move toward or from each other along the bar V′. The actuating-rod $h^6$ for the bar is formed with notches $s^7$, Fig. 77, in position to catch onto the adjacent part of the rear wall of the cabinet, as shown, to hold the bar in either of its two positions, as set forth.

The circular locking-disks B′, Figs. 10 to 16, 18, 27, and 29, employed to prevent improper voting, are usually each formed with one plain face, the other or working face being uneven, giving to the disk different thicknesses, as shown. These disks usually act in pairs, the upper members of which having their working faces formed with a single pair of lifts or elevations $k^6$ opposite each other, as shown in Figs. 11 and 12, and the lower members with two progressive pairs of lifts $l^6$ and $m^6$, Figs. 10 and 13, which together equal in elevation the single lifts $k^6$ of the upper members. By means of the connectors $h$, Figs. 18, 22, 27, 29, for the push-plates and the disks when a key M or L is pushed in or when a push-plate is moved to its voted position by other means, as described, the connected disk B′ will be caused to turn on the shaft $e$. The two connectors $h$ of each pair of disks take hold on opposite sides of the members of the pair, said connectors being substantially parallel, as appears in Fig. 18. Fig. 14 shows a pair of disks in normal position ready to be turned by a voter, and if the push-plate connected with the upper disk, for example, be voted the disk will be turned in the direction indicated by the arrow, the pair taking the relative positions shown in Fig. 15, the lifts $k^6$ of the upper disk having mounted the first pair of lifts $l^6$ of the lower disk. This will press the two disks apart to the amount of the height of the lifts $l^6$. If now the push-plate connected with the lower disk of the pair be voted, turning the disk, as indicated by arrow in Fig. 15, the lifts $m^6$ will glide under the lifts $k^6$ of the upper disk and further separate the two disks, as appears in Fig. 16. With this series of disks adjustable collars $p^6$, Fig. 61, are employed on the shaft $e$, there being one collar above and one below each single pair or other number of pairs of disks, as shown. These collars, properly adjusted, are made rigid with the shaft by some simple means, there being space $r^6$ left below the upper one equal to the elevation of one lift $l^6$ or the combined lifts $l^6$ and $m^6$, as the case may be. If this space be equal only to the height of a lift $l^6$, but one disk of the pair can be turned, as the turning of either disk would take up or fill the space; but if the space be equal to the lifts $l^6$ and $m^6$ combined, as shown at $s^6$, both disks may be turned in voting, and it will be clear that any number of disks or pairs of disks may be included between two collars— as, for example, one disk for each political party—and if a narrow space $r^6$ only be left below the upper collar only one of all the included disks could be turned for the purpose of voting.

In case of an odd number of political parties, as five, for example, there will be five disks—two pairs and a single one—between the collars. In this case the upper face of the lower collar will be formed with lifts like the corresponding face of the bottom disk of a pair, and the disk next to said collar will have its lower face formed with lifts corresponding to the lifts $k^6$ of the upper disk of a pair. Thus constructed the collar, though rigid with the shaft and having no connection with a push-plate, will perform the duties of the lower disk of a pair, it with the disk next above it constituting practically a pair. In case of a considerable number of pairs of disks between two collars—as, for instance, in the matter of grouping of candidates—space is left below the upper collar according to the number of keys in the group it is intended a voter may use. For example, if five political parties have each four candidates for the same office, as members of a board of supervisors, there will be in all twenty candidates in nomination, and each voter must have the privilege of voting for any four of the whole number. In this case ten consecutive pairs of disks will be included between two collars, with space between the latter to admit of the turning of four disks selected anywhere from among the twenty.

For the indorsement by one political party of a candidate or candidates of another party another series of locking-disks $w^7$, Figs. 18 and 27, like the disks B′, are employed. These disks $w^7$ are held on a shaft $x^7$, near to and parallel with the shaft $e$, both shafts being held rigidly in upper and lower rests $y^7$, secured conveniently to the casing of the cabinet. The disks $w^7$ are between the connectors $h$ and attached to them as may be required. For example, if the name of a candidate appear on two or more party-tickets—that is to say, is associated with more than one voting-key—the connectors $h$ common with the push-plates of said voting-keys will be each connected with one of the intermediate locking-disks $w^7$, in addition to being connected with a disk B′, and as these disks $w^7$ are arranged, by means of collars or otherwise, to have but one disk of the number turned at one voting but one key with which said name is associated can be voted, although the disks B′, coacting with these keys, would allow of the candidate's name being voted more than once. Commonly in arranging the intermediate disks $w^7$ only one is placed between two collars on the shaft $x^7$, its under face and the upper face of the lower collar being formed with coacting lifts, as already described.

Public counters $t^6 u^6 v^6$ are provided, (shown in Figs. 27, 29, 51, 52, and 63,) the same being read through rectangular openings $w^6$, Figs. 8, 9, 51, and 63, in the casing of the cabinet and through corresponding openings $x^6$ in the covering-door W', Figs. 6, 8, 9, and 51. These counters are similar to the counters H I K, but have the digits displayed on the outer series of upturned parts, and the counters turn on the shafts $p$, Figs. 51 and 52, immediately above the guide-plate $u^2$. These public counters are actuated by a pawl $y^6$, engaging the teeth of a circular ratchet $z^6$ on the first or units shaft $p$, said ratchet being made rigid with the units-counter $t^6$ by a connecting-sleeve $a^7$. The pawl is connected with the upper end of the detent-bar S by an elbow $e^7$, pivoted at $f^7$ to the bar, so that as the latter is moved, as already stated, to aline the units-counters the pawl will be caused to turn the public units-counter ahead to indicate one vote each time the said bar is moved upward, and as this bar is moved upward every time a vote of any nature is recorded the public counters will indicate at all times the whole number of votes cast by all voters using the machine at an election. The pawl turns on a pivot-pin $b^7$ of a suitable bracket or holder $c^7$, the joint being free to allow of the necessary vertical motions of the free end of the pawl. Also the pivot-joint at $d^7$ between the elbow and the pawl is free and of such nature that the elbow may have both a rocking and a swivel motion over the pawl on account of the motions of the bar S.

The lock-plate N for the counters, Figs. 18, 27, 29, 30, and 36 to 39, is formed with two vertical ribs $z^7$ and $a^8$ in position to occupy the vertical series of recesses $v$ in the columns of tens and the hundreds counters, respectively, when the plate engages the counters, as shown. The outer rib $z^7$ is divided by transverse openings $b^8$, as appears in Fig. 27, to make way for the teeth $y$ of the tens-counters. This lock-plate is supported at its lower end in a bracket $u^7$, Figs. 17, 18, 27, and 30, resting upon the floor C of the cabinet and provided thereat with a horizontal arm $g^7$, having its extreme end controlled by a horizontal controlling slide-rest $h^7$, Fig. 39. Immediately above this rest an ordinary lock $i^7$, provided with key, is placed, secured to the side or casing of the cabinet. The rest $h^7$ is longitudinally movable on a rigid support $k^7$, being formed with an opening $l^7$, in which to receive the end of the arm $g^7$, and two recesses $m^7 n^7$ in its upper side for receiving the bolt $o^7$ of the lock $i^7$. These recesses are so placed in the rest that the lock-bolt will enter the one, $n^7$, when the lock-plate N is turned back to clear the counters, as appears in Fig. 18, and the other recess, $m^7$, when the lock-plate is turned to engage the counters, as shown in Fig. 36. In each position of the slide-rest $h^7$ and the lock-plate the bolt $o^7$ of the lock is turned into the recess presented to it by the attendent inspector by means of a key inserted in the keyhole $p^7$, Fig. 29. The lock-plate is used only at the close of an election, and by means of the mechanism described the counters are rigidly secured in position by the inspector against any movement or alteration resulting from accident or design. Furthermore, the forward end $r^7$ of the slide-rest $h^7$ is formed to pass under the controlling-lever R, Figs. 18, 27 to 29, 36, and 39, when moved into position in which the plate N engages the counters, (shown by full lines in Fig. 39,) and so hold said lever up in its locked position, already described. This final locking of the parts R and $g^7$ holds all the voting mechanism of the machine rigid and against any further action or use by voters.

A horizontal curved rod X', Figs. 1, 4, 5, 6, 8, and 9, is employed, secured to the top of the cabinet for supporting an ordinary curtain (not shown) to screen the voter while manipulating the machine in the act of voting.

A cardboard sheet Y', Figs. 8 and 63, is secured on the left side of the cabinet, having its surface divided into two vertical series of unequal rectangular areas, as shown. Upon the larger areas are placed the names of the different political parties, each party-name being in the horizontal plane of a triplet of counters, as shown. This list of party-names is repeated in each of the larger areas, while in the smaller areas opposite at the left appear the names of the offices to be filled at an election. The list of names of the offices appearing on the card Y' is the same as that shown in Fig. 58 for the guidance of the voters. The several triplets of counters in horizontal lines with the names of the political parties show the whole number of votes cast for each party for the offices named in the column at the left, and to aid the eye in tracing the counters for the different party-names and in the matter of reading off the returns of an election in any case the horizontal rectangular areas $t^7$, Fig. 63, differently shaded, lying between the slits $w^2$, are given different colors—as, for example, the party-colors—red, yellow, blue, white, drab, &c.

What I claim as my invention, and desire to secure by Letters Patent, is—

1. A voting-machine having counters bearing the numerals "0" to "9" inclusive arranged in three vertical columns adapted to indicate units, tens and hundreds respectively, and holders for the counters, and push-plates for turning the counters, a correcting-blade, and pointed branches on the push-plates for coöperation with said correcting-blade, substantially as shown and described.

2. A voting-machine having counters bearing the numerals "0" to "9" inclusive, and arranged in three vertical series or columns adapted to indicate units, tens and hundreds respectively, and three vertical rods or shafts for holding movably thereon said series of counters respectively, and means including push-plates and voting-keys for turning the counters of the first series independently, a correcting-blade, and pointed branches on the push-plates for coöperation with said correcting-blade, substantially as shown and described.

3. A voting-machine having movable counters arranged in three vertical columns to indicate units, tens and hundreds respectively, and rods for holding the counters of said respective columns, the counters being divided into triplets transverse of the columns by intervening ties, and push-plates for turning the units-counter of each triplet, a correcting-blade, and pointed branches on the push-plates for coöperation with said correcting-blade, substantially as shown and described.

4. A voting-machine having a column of units-counters, a column of tens-counters and a column of hundreds-counters coacting, a column of push-plates to turn the counters, a correcting-blade, and pointed branches on the push-plates for coöperation with said correcting-blade, and columns or rows of voting-keys, a key being joined to each push-plate, the latter and the keys being held to move in directions transverse to the columns of counters, substantially as set forth.

5. A voting-machine having rows or columns of counters, a row or column of push-plates, a correcting-blade, and pointed branches on the push-plates for coöperation with said correcting-blade, and voting-keys joined to the respective push-plates, the counters of a single row or column, the push-plates and the voting-keys being equal in number, substantially as shown.

6. A voting-machine having a row of units-counters, a row of tens-counters and a row of hundreds-counters coacting, a row of push-plates to turn the counters, a correcting-blade, and pointed branches on the push-plates for coöperation with said correcting-blade, and rows of voting-keys a key being joined to each push-plate, the latter and the keys being held to move in directions transverse to the rows of counters, the rows of counters, the row of push-plates and the rows of keys being parallel, the counters in a single row, the push-plates and the voting-keys being equal in number, substantially as shown and described.

7. A voting-machine having a row of units-counters, a row of tens-counters and a row of hundreds-counters coacting, a row of push-plates to turn the counters, and rows of voting-keys a key being joined to each push-plate, a correcting-blade, and pointed branches on the push-plates for coöperation with said correcting-blade, and means for correcting or alining the units-counters, substantially as set forth and shown.

8. A voting-machine having a row of units-counters, a row of tens-counters and a row of hundreds-counters coacting, a correcting-blade, a row of push-plates to turn the counters, and rows of voting-keys a key being joined to each push-plate, the latter and the keys being held to move in directions transverse to the rows of counters, and means coacting with pointed branches on the push-plates for coöperating with said correcting-blade, substantially as set forth.

9. A voting-machine having a row of units-counters, a row of tens-counters and a row of hundreds-counters coacting, a row of push-plates to turn the counters, and rows of voting-keys a key being joined to each push-plate, and means a correcting-blade, and pointed branches on the push-plates for coöperation with said correcting-blade, substantially as described.

10. A voting-machine having counters arranged in columns, columns of voting-keys, and push-plates in column moved by the keys to turn the counters, a correcting-blade, and pointed branches on the push-plates for coöperation with said correcting-blade, and means for returning the push-plates after being moved, and for depressing the columns of counters, substantially as and for the purpose specified.

11. A voting-machine having counters in rows, rows of voting-keys, and a row of push-plates moved by the keys to turn the counters, a correcting-blade, and pointed branches on the push-plates for coöperation with said correcting-blade, and a toothed bar to coact with the push-plates, said bar having an irregular tooth to break the order or continuity of the teeth, substantially as and for the purpose specified.

12. A voting-machine having counters in rows, a row of push-plates to turn the counters, a correcting-blade, and pointed branches on the push-plates for coöperation with said correcting-blade, and a lock-plate to engage the counters, with means for controlling the lock-plate and for moving the push-plates, substantially as and for the purpose set forth.

13. A voting-machine having series of counters, a series of push-plates to turn the counters, a correcting-blade, and pointed branches on the push-plates for coöperation with said correcting-blade, a series of forks to engage the push-plates, and means to operate the forks, substantially as shown and described.

14. A voting-machine having series of counters, a series of push-plates to turn the counters, a correcting-blade, and pointed branches on the push-plates for coöperation with said correcting-blade, a series of forks to engage a set of the push-plates, and means to shift said series of forks to engage different sets of push-plates, substantially as and for the purpose specified.

15. A voting-machine having counters in rows, and a row of branched push-plates, having branches, to turn the counters, a series of forks to engage the branches of the push-plates, and means to shift the forks to act upon the branches of different push-plates, and to move certain forks out of action, as and for the purpose specified.

16. A voting-machine having counters in columns, a column of push-plates, with branches, to turn the counters, a series of shiftable forks to engage said branches, and means to withdraw certain forks of the series from action in some of the positions of said series or body of forks, substantially as and for the purpose set forth.

17. A voting-machine having counters in columns, a column of push-plates to turn the counters, a bar, a series of forks on the bar to engage the push-plates, a pair of wheels, a cable on the wheels with its ends secured to the bar, and means for moving the cable to shift the bar in longitudinal direction, substantially as and for the purpose specified.

18. A voting-machine having counters in vertical rows, and a vertical row of push-plates to turn the counters, a bar and a series of forks thereon to engage the push-plates, a pair of wheels, a cable on the wheels connected with the bar, a vertical toothed rack carried by the cable, a horizontal toothed rack, a pinion to coact with the racks, and a hand-lever to turn the horizontal rack and to give it endwise motion, substantially as set forth.

19. A voting-machine having counters in continuous columns or rows to indicate votes cast, with push-plates to turn said counters forward or back, a correcting-blade, and pointed branches on the push-plates for coöperation with said correcting-blade, substantially as set forth.

20. A voting-machine having a series of branched push-plates, and a series of locking-disks one connected with each push-plate, a correcting-blade, and pointed branches on the push-plates for coöperation with said correcting-blade, and means for moving said push-plates to turn the locking-disks, substantially as and for the purpose set forth.

21. A voting-machine having a series of branched push-plates, and a series of locking-disks one connected with each push-plate, a correcting-blade, and pointed branches on the push-plates for coöperation with said correcting-blade, the locking-disks being arranged in continuous column or row, and means for moving said push-plates to turn the locking-disks one way and the other, and voting-keys connected with the push-plates, substantially as shown and described.

22. A voting-machine having a system of voting-keys arranged in vertical order, a series of push-plates, and a system of counters in position to be turned by means of the push-plates, a name being associated with each voting-key and with each counter, a correcting-blade, and pointed branches on the push-plates for coöperation with said correcting-blades, substantially as shown and described.

23. A voting-machine having a system of voting-keys arranged in vertical order, a column of push-plates, and a system of counters in position to be turned by moving the keys, a correcting-blade, and pointed branches on the push-plates for coöperation with said correcting-blade, a name being associated with each key and with each counter, the keys and the counters being adapted to be moved forward by the voter, to indicate a vote or back to recall the vote, substantially as set forth.

24. A voting-machine having a series of counters, and a series of voting-keys, and a series of push-plates joined to the keys to turn the counters, the latter, the voting-keys and the push-plates being arranged in continuous rows or columns and divided into two classes, a correcting-blade, and pointed branches on the push-plates for coöperation with said correcting-blade, and a shiftable bar to coact with the push-plates, formed with teeth and with intermediate spaces to receive the push-plates, the advancing of a push-plate of either class into a space of the bar acting to move the latter into position to oppose the advance of a push-plate of the other class, substantially as set forth.

25. A voting-machine having voting-keys, counters, and push-plates arranged in parallel columns and coacting, a correcting-blade, and pointed branches on the push-plates for coöperation with said correcting-blade, a shiftable bar having two separate series of teeth to coact with the push-plates, and spaces between the teeth to receive the branched push-plates, a push-plate moved into a space of one series of teeth serving to shift the bar to bring the teeth of the other series opposite the adjacent push-plates to hold them out of action, as and for the purpose specified.

26. A voting-machine having voting-keys, counters and push-plates associated and coacting, a series of bars adapted to engage the push-plates, a wheel, and a lever for turning the wheel, the latter having projections to actuate said bars, substantially as and for the purpose specified.

27. A voting-machine having push-plates and counters coacting, the push-plates being formed with extended parts in a row, a vertical bar in position to press said extended parts, a controlling-lever for said vertical bar, a wheel having a projection to engage said controlling-lever, and means for turning the wheel, substantially as shown and described.

28. A voting-machine having push-plates and counters coacting, the push-plates having branches, a correcting-bar with knife-edge to meet said branches, and means for actuating the correcting-bar, substantially as and for the purpose set forth.

29. A voting-machine having push-plates and counters coacting, the push-plates being formed with pointed branches, a correcting-bar having a knife-edge in position to meet said branches, a wheel, a cam on the wheel, a roller to coact with the cam, and a holder for the roller connected with said bar, substantially as and for the purpose specified.

30. A voting-machine having columns of counters in a body, and a column of push-plates to turn the counters, a vertical bar in position to move the push-plates, a controlling-lever for the vertical bar, a wheel for actuating the controlling-lever and for moving the counters in vertical directions, the moving of said body of counters by the wheel being in advance of said moving of the push-plates, substantially as and for the purpose specified.

31. A voting-machine having a series of counters, and a series of push-plates to turn the counters, the push-plates having pointed branches, a correcting-bar with knife-edge in position to engage said branches to move the push-plates, a wheel, a cam on the wheel with intermediate mechanism to actuate said correcting-bar, a returning-bar for said push-plates, actuated by said wheel, and means to move said wheel through short distances, the latter acting upon the correcting-bar at the beginning of its motion and upon the returning-bar near the close of its motion, substantially as described.

32. A voting-machine having a series of counters, a series of push-plates to turn the counters, a returning-bar in position to engage said push-plates, a controlling-lever for said returning-bar, a wheel for actuating said controlling-lever, a cam moved by said wheel to engage the controlling-lever, and means for turning the wheel, substantially as shown and described.

33. A voting-machine having a series of counters, a series of push-plates to turn the counters, a returning-bar in position to engage said push-plates, a controlling-lever for said returning-bar, a wheel for actuating the controlling-lever, a cam to engage the controlling-lever, a notched thrust-bar actuated by the wheel to turn said cam, and a pawl to engage with the notches of said thrust-bar, and means for turning the wheel, substantially as shown and described.

34. A voting-machine having a series of counters, a series of push-plates to turn the counters, a returning-bar in position to engage said push-plates, a controlling-lever for said returning-bar, a wheel for actuating the controlling-lever, a cam to engage said controlling-lever, a notched thrust-bar actuated by the wheel to turn the cam, a pawl to engage the thrust-bar, and means for lifting the pawl, substantially as and for the purpose stated.

35. A voting-machine having a series of counters, a series of movable push-plates having branches for turning the counters, a correcting-blade, and pointed branches on the push-plates for coöperation with said correcting-blade, a series of voting-keys secured to the push-plates, a bar having a recess, to oppose said push-plates, and means for controlling said bar, substantially as and for the purpose set forth.

36. A voting-machine having a series of counters, a series of movable push-plates having branches for turning the counters, a series of voting-keys secured to the push-plates, a bar having a recess, to oppose the push-plates, and means for controlling the bar, and movable sections on said bar adapted to cover parts of said recess, a correcting-blade, and pointed branches on the push-plates for coöperation with said correcting-blade, substantially as and for the purpose set forth.

37. A voting-machine having a series of counters, a series of push-plates to engage the counters, a series of forks in a body to move the push-plates, a holding-bar for the forks, a cable to carry the holding-bar, a pair of toothed racks crossing each other one held by the cable, a pinion for the racks, and means for moving the racks longitudinally, substantially as and for the purpose specified.

38. A voting-machine having a series of counters, a series of push-plates to actuate the counters, a series of shiftable forks in a body to move the push-plates, a series of stop-keys to determine the positions of the body of forks, and means for turning the latter, substantially as and for the purpose described.

39. A voting-machine having a series of counters, a series of push-plates to actuate the counters, a series of shiftable forks to move the push-plates, a series of stop-keys to control the positions of the forks, with means for turning the latter, and a table of names associated with said stop-keys, substantially as shown and described.

40. A voting-machine having a series of counters, a series of push-plates to actuate the counters, a series of shiftable forks to move the push-plates, a series of stop-keys to control the positions of the forks, with means for turning the latter, and a table of party-names associated with said stop-keys, the latter being adapted to be moved by hand forward into position of action or back out of action, substantially as and for the purpose specified.

41. A voting-machine having a series of counters in columns, a series of push-plates to engage the counters, a pivotal lock-plate for the counters, a returning-bar for the push-plates, and means for holding the lock-plate in action and the returning-bar stationary, substantially as and for the purpose specified.

42. A voting-machine having a series of counters in columns, a series of push-plates to engage the counters, a pivotal lock-plate for the counters, a returning-bar for the push-plates, a controlling-lever for the returning-bar, an arm for the lock-plate, a notched slide for simultaneously holding the arm and the controlling-lever, and a lock with bolt for engaging the notched slide, substantially as and for the purpose specified.

43. A voting-machine comprising a ballot-holder, a ballot-cage in the ballot-holder adapted to occupy two positions alternately, and means for alternately holding and releasing the ballot-cage, the releasing means being disposed within the ballot-holder, substantially as and for the purpose specified.

44. A voting-machine comprising a ballot-holder, a movable ballot-cage in the ballot-holder, a latch to engage the ballot-cage, and means for actuating the latch, and means within the ballot-holder for releasing the ballot-cage, substantially as shown and described.

45. A voting-machine comprising a ballot-holder, a movable ballot-cage in the ballot-holder, a latch to engage the ballot-cage, a shaft in the ballot-holder, a cam on the shaft to engage the latch, and means for turning the shaft, substantially as shown and described.

46. A voting-machine comprising an inclosing cabinet, a ballot-holder within the inclosing cabinet, a ballot-cage within the ballot-holder adapted to occupy two positions alternately, a holder to detain the ballot-cage temporarily in one of its positions, and means within the ballot-holder for releasing the ballot-cage, substantially as shown and described.

47. A voting-machine comprising an inclosing cabinet, a ballot-holder within the inclosing cabinet, a ballot-cage within the ballot-holder adapted to occupy two positions alternately, and means within the ballot-holder for temporarily holding the ballot-cage immovable in one of its positions and releasing means for said ballot-cage, substantially as and for the purpose set forth.

48. A voting-machine having a series of counters, a correcting-blade, a series of branched push-plates to turn the counters, a series of movable fingers in position to engage the push-plates, the fingers being formed with openings, substantially as and for the purpose described.

49. A voting-machine having a series of counters, a correcting-blade, a series of branched push-plates to turn the counters, a series of movable fingers, having openings, to engage the push-plates, and a series of receiving-plates for tickets coacting with said fingers, substantially as shown and described.

50. A voting-machine having a series of counters, a series of push-plates to turn the counters, a series of movable fingers, having openings, to engage the push-plates, and a series of receiving-plates formed with cells for tickets, coacting with the fingers, and means for turning the receiving-plates, substantially as and for the purpose set forth.

51. A voting-machine having a series of counters, a series of push-plates to turn the counters, each push-plate being adapted to occupy either a normal position or an advance position, a series of fingers for engaging the push-plates, each adapted to occupy either a normal position or an advance position, the moving of either a push-plate or its coacting finger to its advance position serving to hold the other in its normal position, substantially as shown and described.

52. A voting-machine having a series of counters, a series of push-plates to turn the counters, each push-plate being adapted to occupy either a normal position or an advance position, a series of fingers for engaging the push-plates, each adapted to occupy either a normal position or an advance position, either a push-plate or its coacting finger being in its advanced position, the moving of the other to its advance position serving to return the first to its normal position, substantially as set forth.

53. A voting-machine having a series of counters, a series of push-plates to turn the counters, each push-plate being adapted to occupy either a normal position or an advance position, a series of fingers for engaging the push-plates, each adapted to occupy either a normal position or an advance position, the space occupied by a push-plate and by its coacting finger in their advance positions being common to both, substantially as shown.

54. A voting-machine having a series of counters, a series of push-plates to turn the counters, a ballot-cage, a series of fingers adapted to engage the push-plates, and to control the ballot-cage, substantially as shown and described.

55. A voting-machine having a series of counters in a horizontal plane, a series of branched push-plates to turn said counters, a ratchet secured to a counter, a pawl to engage the ratchet, a reciprocating bar connected with the pawl, and means to actuate said bar, a correcting-blade disposed for coöperation with the branches of said push-plates, substantially as shown and described.

56. A voting-machine having a series of counters, a series of branched push-plates to turn the counters, a correcting-blade disposed for coöperation with the branches of said push-plates, and movable bars to engage the push-plates and the counters, and a hand-lever with intermediate mechanism for actuating said movable bars, substantially as shown and described.

57. A voting-machine comprising a ballot-holder, a ballot-cage pivoted in the ballot-holder and having a vertical slit in its front side, and rigid dischargers piercing the side of the ballot-cage to dislodge the ticket, and means for swinging and for temporarily locking the ballot-cage, and means within the ballot-holder for releasing the ballot-cage, substantially as and for the purpose specified.

In witness whereof I have hereunto set my hand, this 6th day of January, 1902, in the presence of two subscribing witnesses.

JOHN BOMA.

Witnesses:
ENOS B. WHITMORE,
MINNIE SMITH.